(12) United States Patent (10) Patent No.: US 12,628,178 B2
Bhamri et al. (45) Date of Patent: *May 12, 2026

---

(54) USER EQUIPMENT AND NETWORK NODE INVOLVED IN THE TRANSMISSION OF SIGNALS USING TRANSMISSION PARAMETERS DETERMINED ACCORDING TO TRANSMISSION CONFIGURATION INDICATION

(71) Applicant: Panasonic Intellectual Property Corporation of America, Torrance, CA (US)

(72) Inventors: Ankit Bhamri, Rödermark (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/762,438

(22) Filed: Jul. 2, 2024

(65) Prior Publication Data

US 2024/0357609 A1 Oct. 24, 2024

Related U.S. Application Data

(63) Continuation of application No. 18/477,395, filed on Sep. 28, 2023, now Pat. No. 12,063,663, which is a
(Continued)

(30) Foreign Application Priority Data

Nov. 12, 2018 (EP) ..................................... 18205761

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0048* (2013.01); *H04L 69/324* (2013.01); *H04W 76/27* (2018.02)

(58) Field of Classification Search
CPC .... H04W 72/23; H04W 76/27; H04L 5/0048; H04L 69/324; H04L 5/0094;
(Continued)

(56) References Cited

U.S. PATENT DOCUMENTS 11,818,721 B2 * 11/2023 Bhamri ................. H04L 5/0023
12,063,663 B2 * 8/2024 Bhamri ................. H04L 69/324
(Continued)

FOREIGN PATENT DOCUMENTS

JP 2022511201 A 1/2022
KR 101915996 B1 11/2018
(Continued)

OTHER PUBLICATIONS

Notice of Reasons for Rejection, dated Jan. 17, 2025, for Korean Patent Application No. 2020-7037689. (15 pages) (with English translation).
(Continued)

*Primary Examiner* — Justin T Van Roie
(74) *Attorney, Agent, or Firm* — Seed Intellectual Property Law Group LLP

(57) ABSTRACT

The present disclosure relates to a user equipment (UE), a network node, and communication methods respectively for a UE and a network node. The UE comprises a transceiver which, in operation, receives, on a physical downlink control channel, PDCCH, downlink control information, DCI, for scheduling a plurality of transmissions or receptions between the UE and a plurality of transmission and reception points, TRPs, on a plurality of channels, the DCI including one or more indicators indicating one or more
(Continued)

respective transmission parameters, and circuitry which, in operation, obtains, based on the one or more indicators and on a configuration, a plurality of values respectively of the one or more transmission parameters. The transceiver, in operation, performs the plurality of transmissions or receptions using a respective one of the plurality of values of the one or more transmission parameters for each of the plurality of transmissions or receptions.

12 Claims, 12 Drawing Sheets

Related U.S. Application Data continuation of application No. 17/131,313, filed on Dec. 22, 2020, now Pat. No. 11,818,721, which is a continuation of application No. PCT/EP2019/081037, filed on Nov. 12, 2019.

(51) Int. Cl.
  *H04L 69/324*    (2022.01)
  *H04W 76/27*    (2018.01)

(58) Field of Classification Search
  CPC ... H04L 5/0051; H04L 5/0053; H04L 5/0035; H04L 5/0023; H04B 7/024
  See application file for complete search history.

(56) References Cited

U.S. PATENT DOCUMENTS

| | | | |
|---|---|---|---|
| 2018/0042028 A1 | 2/2018 | Nam et al. | |
| 2021/0051699 A1 | 2/2021 | Bhamri et al. | |
| 2021/0337548 A1 | 10/2021 | Gao et al. | |
| 2022/0116247 A1 | 4/2022 | Sengupta et al. | |
| 2022/0132551 A1 | 4/2022 | Jiang et al. | |

FOREIGN PATENT DOCUMENTS

| | | | |
|---|---|---|---|
| RU | 2601738 C2 | 11/2016 | |
| RU | 2638020 C1 | 12/2017 | |
| WO | WO 2018128365 A1 | 7/2018 | |
| WO | WO 2018143756 A1 | 8/2018 | |

OTHER PUBLICATIONS

ZTE, "Enhancements on multi-TRP/Panel transmission," R1-1812256, Agenda item: 7.2.8.2, 3GPP TSG RAN WG1 #95, Spokane, USA, Nov. 12-16, 2018. (14 pages).
3GPP TR 36.932 V15.0.0, "3rd Generation Partnership Project; Technical Specification Group Radio Access Network; Scenarios and requirements for small cell enhancements for E-UTRA and E-UTRAN (Release 15)," Jun. 2018, 14 pages.
3GPP TS 38.211 V15.0.0, "3rd Generation Partnership Project; Technical Specification Group Radio Access Network; NR; Physical channels and modulation (Release 15)," Dec. 2017, 73 pages.
3GPP TS 38.212 V15.2.0, "3rd Generation Partnership Project; Technical Specification Group Radio Access Network; NR; Multiplexing and channel coding (Release 15)," Jun. 2018, 98 pages.
CATT, "Discussion on remaining details of DMRS," R1-1715807, Agenda Item: 6.2.3.3, 3GPP TSG RAN WG1 Meeting NR#3, Nagoya, Japan, Sep. 18-21, 2017, 9 pages.
Chinese Office Action, issued Sep. 1, 2023, for Chinese Patent Application No. 201980040677.9. (37 pages) (with English translation).
English translation of Russian Search Report, dated Apr. 14, 2022, for Russian Patent Application No. 2020133467/07(061142). (7 pages).

Ericsson, "DL multi-TRP and multi-panel transmission," R1-1711013, Agenda Item: 5.1.2.1.6, 3GPP TSG-RAN WG1 #89ah-NR, Qingdao, China, Jun. 27-30, 2017. (4 pages).
Huawei, HiSilicon, "DL multi-TRP/panel operation in R15," R1-1802073, Agenda Item: 7.1.2.1.5, 3GPP TSG RAN WG1 Meeting #92, Athens, Greece, Feb. 26-Mar. 2, 2018, 3 pages.
Huawei, HiSilicon, "Enhancements on multi-TRP/panel transmission in NR," R1-1809117, Agenda Item: 7.2.8, 3GPP TSG RAN WG1 Meeting #94, Gothenburg, Sweden, Aug. 20-24, 2018, 10 pages.
Huawei, HiSilicon, "Signaling of DMRS ports for SU/MU-MIMO," R1-1717310 Agenda Item: 7.2.3.3, 3GPP TSG RAN WG1 Meeting #90bis, Prague, Czech Republic, Oct. 9-13, 2017, 15 pages.
International Search Report, mailed Jan. 20, 2020, for International Application No. PCT/EP2019/081037, 3 pages.
Japanese Notice of Reasons for Rejection dated May 28, 2024, for the corresponding Japanese Patent Application No. 2020-570858, 7 pages. (With English Translation).
Lenovo et al., "Discussion of enhancement for multi-TRP/multi-panel transmission," R1-1810571, Agenda Item: 7.2.8.2, 3GPP TSG RAN WG1 Meeting #94bis, Chengdu, China, Oct. 8-12, 2018, 7 pages.
MCC Support, "Final Report of 3GPP TSG RAN WG1 #93 V1.0.0 (Busan, South Korea, May 21-25, 2018)," R1-1808001, 3GPP TSG RAN WG1 Meeting #94, Gothenburg, Sweden, Aug. 20-24, 2018, 200 pages.
Panasonic, "On multi-TRP enhancements for NR MIMO in Rel. 16," R1-1813135, Agenda Item: 7.2.8.2, 3GPP TSG RAN WG1 Meeting #95, Spokane, USA, Nov. 12-16, 2018, 4 pages.
Samsung, "Revised WID: Enhancements on MIMO for NR," RP-182067, Agenda Item: 9.4.1, 3GPP TSG RAN Meeting #81, Gold Coast, Australia, Sep. 10-13, 2018, 5 pages.
Sesia et al., "LTE: The UMTS Long Term Evolution," Second Edition, Sections 8.2, 9.3.5, 11.2.2.2 and 29.1.1, 28 pages.
ZTE, "Enhancements on multi-TRP transmission and reception," R1-1808202, Agenda item: 7.1.2.5, 3GPP TSG RAN WG1 Meeting #94, Gothenburg, Sweden, Aug. 20-24, 2018. (5 pages).
ETSI, "5G; NR; Multiplexing and channel coding, (3GPP TS 38.212 version 15.3.0 Release 15)," Technical Specification, ETSI TS 138 212 V15.3.0, Oct. 2018. (102 pages).
ETSI, "5G; NR; Physical layer procedures for data, (3GPP TS 38.214 version 15.3.0 Release 15)," Technical Specification, ETSI TS 138 214 V15.3.0, Oct. 2018. (99 pages).
Huawei, HiSilicon, "Summary of AI: 7.2.8.2 Enhancements on Multi-TRP/Panel Transmission," R1-1811882, Agenda Item: 7.2.8.2, 3GPP TSG RAN WG1 Meeting #94bis, Chengdu, China, Oct. 8-12, 2018. (22 pages).
Intel Corporation, "Remaining Issues on Beam Management," R1-1810751, Agenda item: 7.1.2.3, 3GPP TSG RAN WG1 Meeting #94b, Chengdu, China, Oct. 8-12, 2018. (15 pages).
MCC Support, "Final Report of 3GPP TSG RAN WG1 #94bil v1.1.0 (Chengdu, Chine, Oct. 8-12, 2018)," R1-1813901, 3GPP TSG RAN WG1 Meeting #95, Spokane, USA, Nov. 12-16, 2018. (197 pages).
MediaTek Inc., "Enhancements on multi-TRP/panel transmission," R1-1812349, Agenda Item: 7.2.8.2, 3GPP TSG RAN WG1 Meeting #95, Spokane, USA, Nov. 12-16, 2018. (3 pages).
Nokia, Nokia Shanghai Bell, "Summary of QCL," R1-1803328, Agenda item: 7.1.2.3.7, 3GPP TSG RAN WG1#92, Athens, Greece, Feb. 26-Mar. 2, 2018. (33 pages).
Notice of Allowance, dated Sep. 21, 2025, for Korean Patent Application No. 10-2020-7037689. (5 pages)(with English Translation).
NTT Docomo, Inc., "Offline summary for PDCCH structure and search space part 2," R1-1811926, Agenda Item: 7.1.3.1, 3GPP TSG RAN WG1 Meeting #94bis, Chengdu, China, Oct. 8-12, 2018. (66 pages).
Samsung, "Remaining details on QCL," R1-1720315, Agenda item: 7.2.3.7, 3GPP TSG RAN WG1#91, Reno, USA, Nov. 27-Dec. 1, 2017. (11 pages).

* cited by examiner

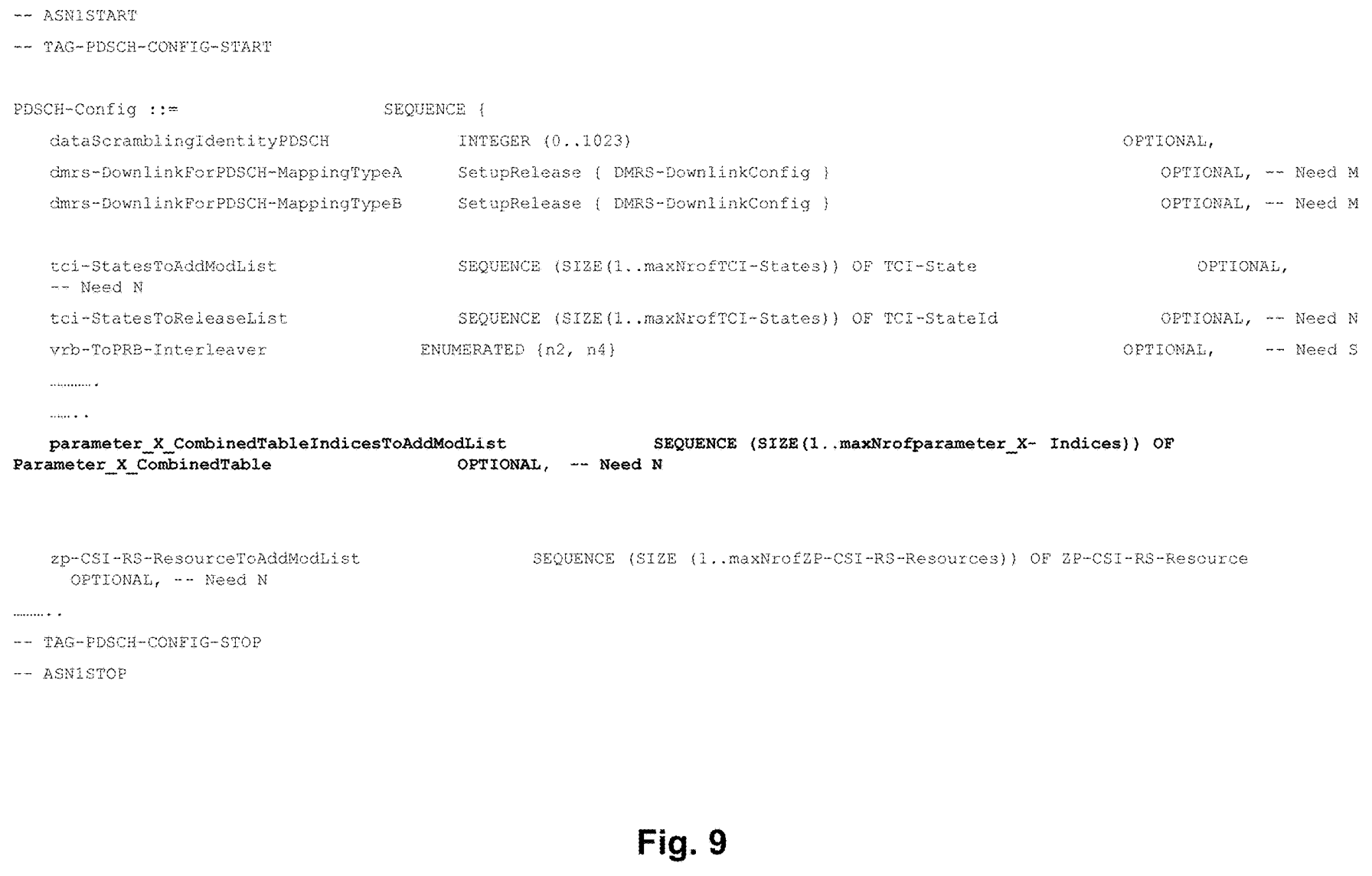

```
-- ASN1START

-- TAG-PDSCH-CONFIG-START

PDSCH-Config ::=              SEQUENCE {
    dataScramblingIdentityPDSCH      INTEGER (0..1023)                                       OPTIONAL,
    dmrs-DownlinkForPDSCH-MappingTypeA  SetupRelease { DMRS-DownlinkConfig }                 OPTIONAL,  -- Need M
    dmrs-DownlinkForPDSCH-MappingTypeB  SetupRelease { DMRS-DownlinkConfig }                 OPTIONAL,  -- Need M tci-StatesToAddModList        SEQUENCE (SIZE(1..maxNrofTCI-States)) OF TCI-State         OPTIONAL,
    -- Need N
    tci-StatesToReleaseList       SEQUENCE (SIZE(1..maxNrofTCI-States)) OF TCI-StateId       OPTIONAL,  -- Need N
    vrb-ToPRB-Interleaver         ENUMERATED {n2, n4}                                        OPTIONAL,  -- Need S
    .........
    ........

parameter_X_CombinedTableIndicesToAddModList       SEQUENCE (SIZE(1..maxNrofparameter_X- Indices)) OF
    Parameter_X_CombinedTable          OPTIONAL,   -- Need N zp-CSI-RS-ResourceToAddModList         SEQUENCE (SIZE (1..maxNrofZP-CSI-RS-Resources)) OF ZP-CSI-RS-Resource
        OPTIONAL,  -- Need N
    ........

-- TAG-PDSCH-CONFIG-STOP

-- ASN1STOP
```

Fig. 9

```
-- ASN1START
-- TAG-PDSCH-CONFIG-START

PDSCH-Config ::=                          SEQUENCE {
    dataScramblingIdentityPDSCH               INTEGER (0..1023)                                            OPTIONAL,
    dmrs-DownlinkForPDSCH-MappingTypeA        SetupRelease { DMRS-DownlinkConfig }            OPTIONAL,  --
Need M
    dmrs-DownlinkForPDSCH-MappingTypeB        SetupRelease { DMRS-DownlinkConfig }            OPTIONAL,  --
Need M
    tci-StatesToAddModList                    SEQUENCE (SIZE(1..maxNrofTCI-States)) OF TCI-State          OPTIONAL,
-- Need N
    tci-StatesToReleaseList                   SEQUENCE (SIZE(1..maxNrofTCI-States)) OF TCI-StateId         OPTIONAL,  --
Need N
    vrb-ToPRB-Interleaver                     ENUMERATED {n2, n4}                                          OPTIONAL,  --
Need S
    ......
    DMRSPortMultiTRP_CombinedTableIndicesToAddModList      SEQUENCE (SIZE(1..maxNrofDMRSPortMultiTRP-   Indices)) OF
DMRSPortMultiTRP_CombinedTable                    OPTIONAL,     -- Need N zp-CSI-RS-ResourceToAddModList            SEQUENCE (SIZE (1..maxNrofZP-CSI-RS-Resources)) OF ZP-CSI-RS-Resource
        OPTIONAL,  -- Need N
    ...
-- TAG-PDSCH-CONFIG-STOP
-- ASN1STOP
```

Fig. 10

```
-- ASN1START

-- TAG-PDSCH-CONFIG-START

PDSCH-Config ::=                            SEQUENCE {
    dataScramblingIdentityPDSCH                 INTEGER (0..1023)                                   OPTIONAL,
    dmrs-DownlinkForPDSCH-MappingTypeA          SetupRelease { DMRS-DownlinkConfig }               OPTIONAL,   -- Need
M
    dmrs-DownlinkForPDSCH-MappingTypeB          SetupRelease { DMRS-DownlinkConfig }               OPTIONAL,   -- Need
M
    tci-StatesToAddModList                      SEQUENCE (SIZE(1..maxNrofTCI-States)) OF TCI-State  OPTIONAL,
    -- Need N
    tci-StatesToReleaseList                     SEQUENCE (SIZE(1..maxNrofTCI-States)) OF TCI-StateId OPTIONAL,  -- Need
N
    vrb-ToPRB-Interleaver                       ENUMERATED {n2, n4}                                 OPTIONAL,   -- Need
S
    ........
    ........
    TCIStateMultiTRP_CombinedTableIndicesContentToAddModList        SEQUENCE (SIZE(1..maxNrofTCIStateMultiTRP-
    Indices)) OF TCIStateMultiTRP_CombinedTable                     OPTIONAL,   -- Need N zp-CSI-RS-ResourceToAddModList              SEQUENCE (SIZE (1..maxNrofZP-CSI-RS-Resources)) OF ZP-CSI-RS-Resource
        OPTIONAL,   -- Need N

........

-- TAG-PDSCH-CONFIG-STOP

-- ASN1STOP
```

Fig. 11

```
-- ASN1START

-- TAG-CONTROLRESOURCESET-START

ControlResourceSet ::=            SEQUENCE {
    controlResourceSetId          ControlResourceSetId, frequencyDomainResources      BIT STRING (SIZE (45)),
    duration                      INTEGER (1..maxCoReSetDuration),
    cce-REG-MappingType           CHOICE {
        interleaved               SEQUENCE {
            reg-BundleSize        ENUMERATED {n2, n3, n6},
            interleaverSize       ENUMERATED {n2, n3, n6},
            shiftIndex            INTEGER(0..maxNrofPhysicalResourceBlocks-1)  OPTIONAL  --
Need S
        },
        nonInterleaved            NULL
    },
    precoderGranularity           ENUMERATED {sameAsREG-bundle, allContiguousRBs},
    tci-StatesPDCCH-ToAddList     SEQUENCE (SIZE (1..maxNrofTCI-StatesPDCCH)) OF TCI-StateId   OPTIONAL,
-- Need N
    tci-StatesPDCCH-ToReleaseList SEQUENCE (SIZE (1..maxNrofTCI-StatesPDCCH)) OF TCI-StateId
OPTIONAL,  -- Need N
    tci-PresentInDCI              ENUMERATED {enabled}                        OPTIONAL,  -- Need S
    pdcch-DMRS-ScramblingID       INTEGER (0..65535)                                    OPTIONAL,  --
Need S
    parameter_X-CombinedTableIndicationInDCI            ENUMERATED {enabled}   OPTIONAL,  -- Need S

```
-- ASN1START
-- TAG-CONTROLRESOURCESET-START

ControlResourceSet ::=          SEQUENCE {
    controlResourceSetId            ControlResourceSetId, frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)    OPTIONAL -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE (1..maxNrofTCI-StatesPDCCH)) OF TCI-StateId    OPTIONAL
        -- Need N
    tci-StatesPDCCH-ToReleaseList   SEQUENCE(SIZE (1..maxNrofTCI-StatesPDCCH)) OF TCI-StateId    OPTIONAL,
        -- Need N
    tci-PresentInDCI                ENUMERATED {enabled}                               OPTIONAL, -- Need S
    pdcch-DMRS-ScramblingID         INTEGER (0..65535)                                 OPTIONAL, -- Need S
    DMRSPortMultiTRP-CombinedTableIndicationInDCI  ENUMERATED {enabled}                OPTIONAL, -- Need S
    ...
}
```

Fig. 13

```
-- ASN1START
-- TAG-CONTROLRESOURCESET-START

ControlResourceSet ::=           SEQUENCE {
    controlResourceSetId             ControlResourceSetId, frequencyDomainResources         BIT STRING (SIZE (45)),
    duration                         INTEGER (1..maxCoReSetDuration),
    cce-REG-MappingType              CHOICE {
        interleaved                      SEQUENCE {
            reg-BundleSize                   ENUMERATED {n2, n3, n6},
            interleaverSize                  ENUMERATED {n2, n3, n6},
            shiftIndex                       INTEGER(0..maxNrofPhysicalResourceBlocks-1)      OPTIONAL -- Need S
        },
        nonInterleaved                   NULL
    },
    precoderGranularity              ENUMERATED {sameAsREG-bundle, allContiguousRBs},
    tci-StatesPDCCH-ToAddList        SEQUENCE(SIZE (1..maxNrofTCI-StatesPDCCH)) OF TCI-StateId      OPTIONAL,
    -- Need N
    tci-StatesPDCCH-ToReleaseList    SEQUENCE(SIZE (1..maxNrofTCI-StatesPDCCH)) OF TCI-StateId      OPTIONAL
    -- Need N
    tci-PresentInDCI                 ENUMERATED {enabled}                                      OPTIONAL, -- Need S
    pdcch-DMRS-ScramblingID          INTEGER (0..65535)                                        OPTIONAL, -- Need S TCIStateMultiTRP-CombinedTableIndicationInDCI    ENUMERATED {enabled}    OPTIONAL,
    -- Need S
    ...
```

USER EQUIPMENT AND NETWORK NODE INVOLVED IN THE TRANSMISSION OF SIGNALS USING TRANSMISSION PARAMETERS DETERMINED ACCORDING TO TRANSMISSION CONFIGURATION INDICATION

BACKGROUND

1. Technical Field

The present disclosure relates to transmission and reception of signals in a communication system. In particular, the present disclosure relates to methods and apparatuses for such transmission and reception.

2. Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE and NR, further modifications and options may facilitate efficient operation of the communication system as well as particular devices pertaining to the system.

BRIEF SUMMARY

One non-limiting and exemplary embodiment facilitates physical downlink control channel (PDCCH) signaling for multi-TRP (transmission and reception point) communication.

In one general aspect, the techniques disclosed herein feature a user equipment (UE) comprising a transceiver which, in operation, receives, on a physical downlink control channel, PDCCH, downlink control information, DCI, for scheduling a plurality of transmissions or receptions between the UE and a plurality of transmission and reception points, TRPs, on a plurality of channels, the DCI including one or more indicators indicating one or more respective transmission parameters, and circuitry which, in operation, obtains, based on the one or more indicators and on a configuration, a plurality of values respectively of the one or more transmission parameters, wherein the transceiver, in operation, performs the plurality of transmissions or receptions using a respective one of the plurality of values of the one or more transmission parameters for each of the plurality of transmissions or receptions.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

2

Figure 2:
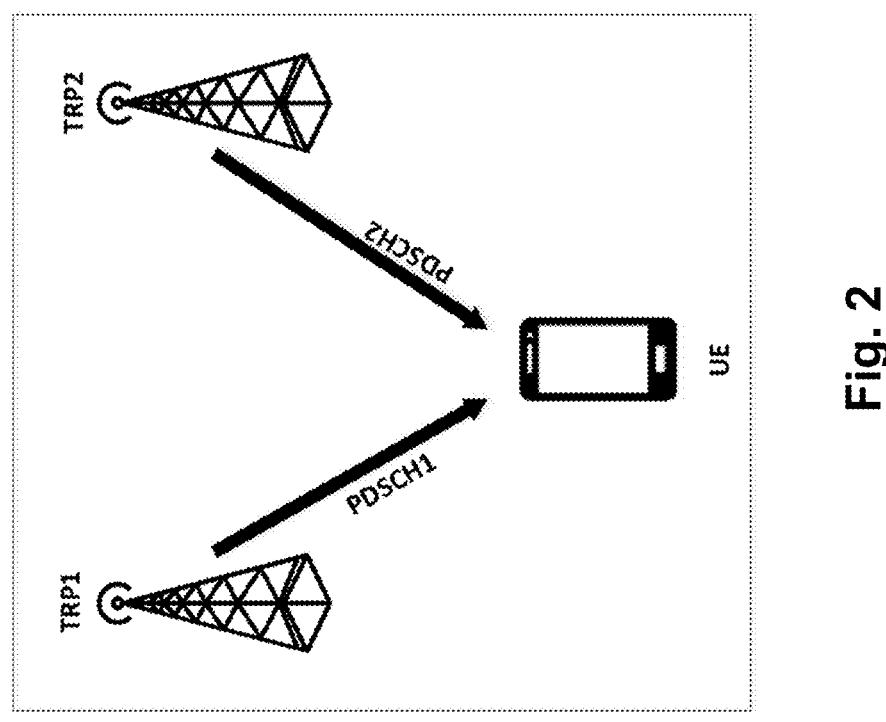
Figure 1:
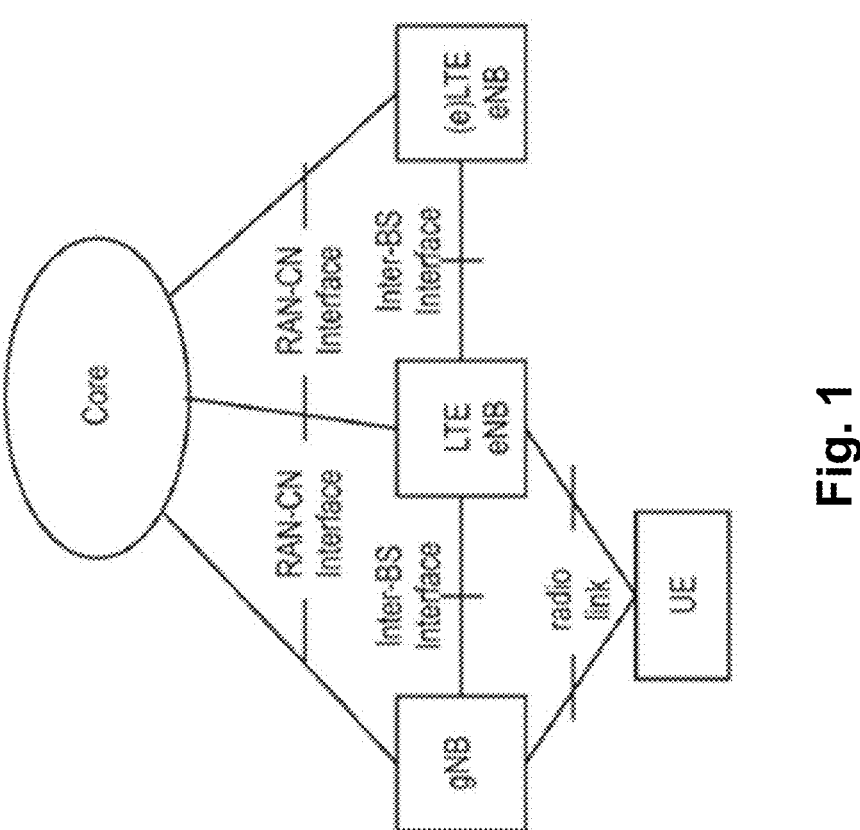
Figure 3:
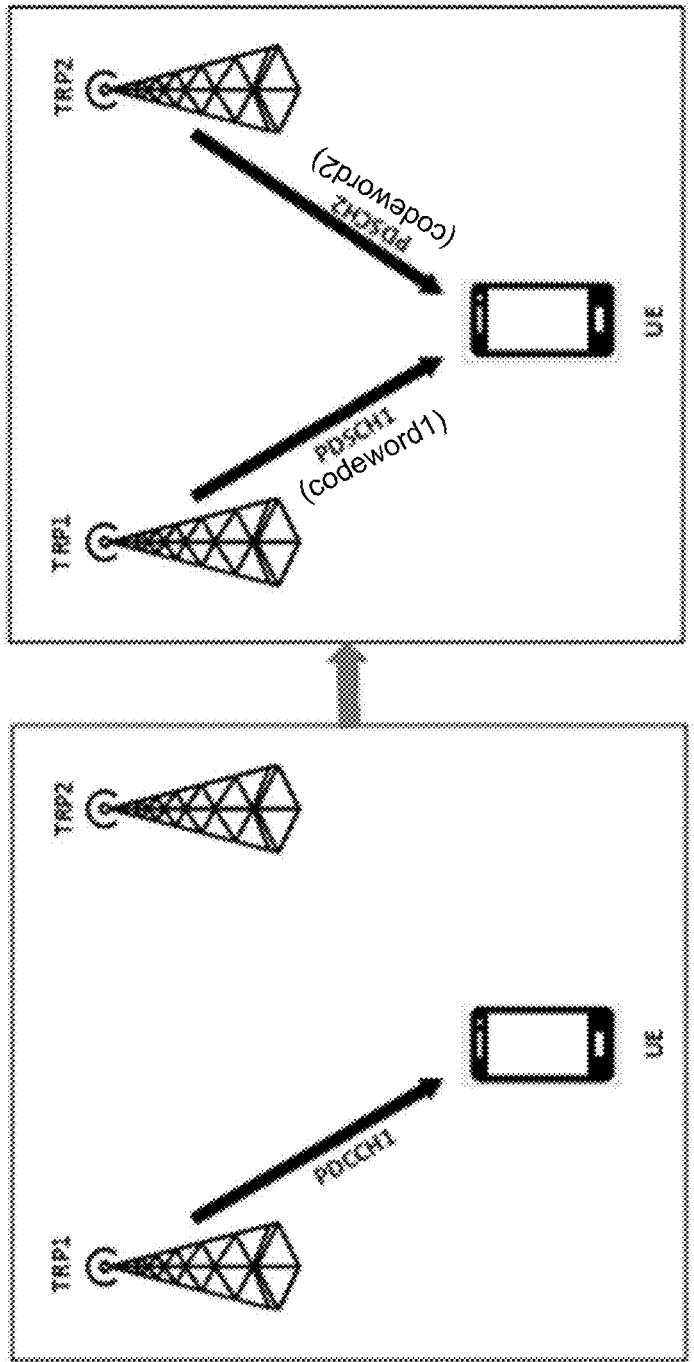
Figure 4:
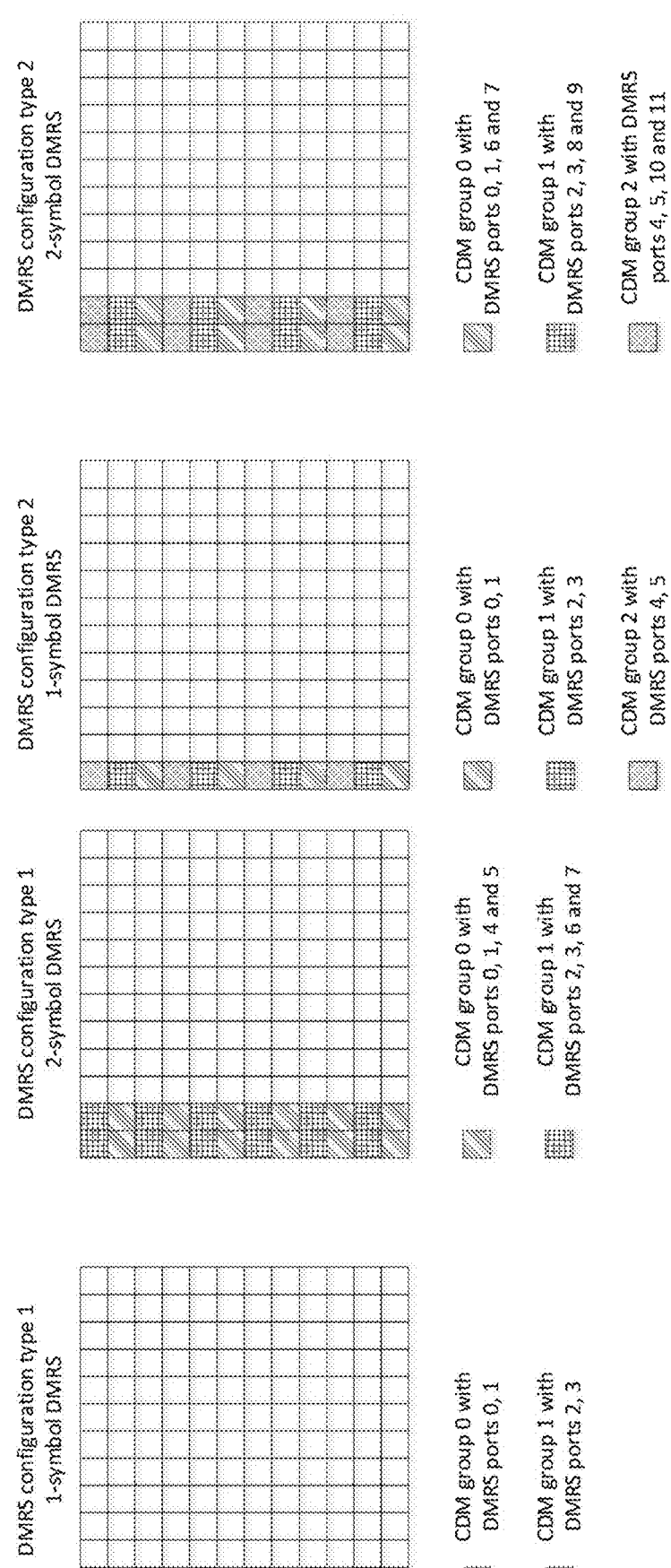
Figure 5:
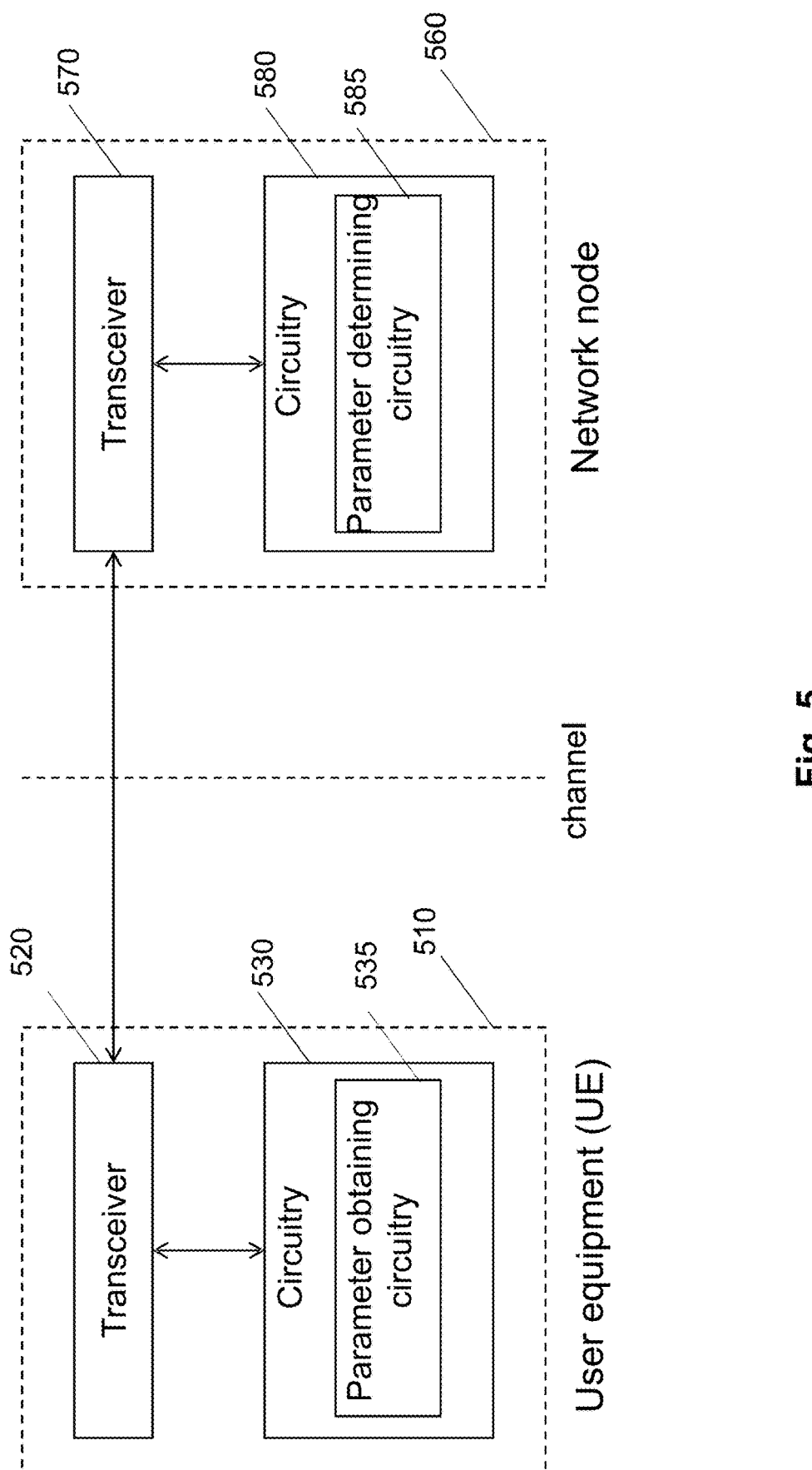
Figure 6:
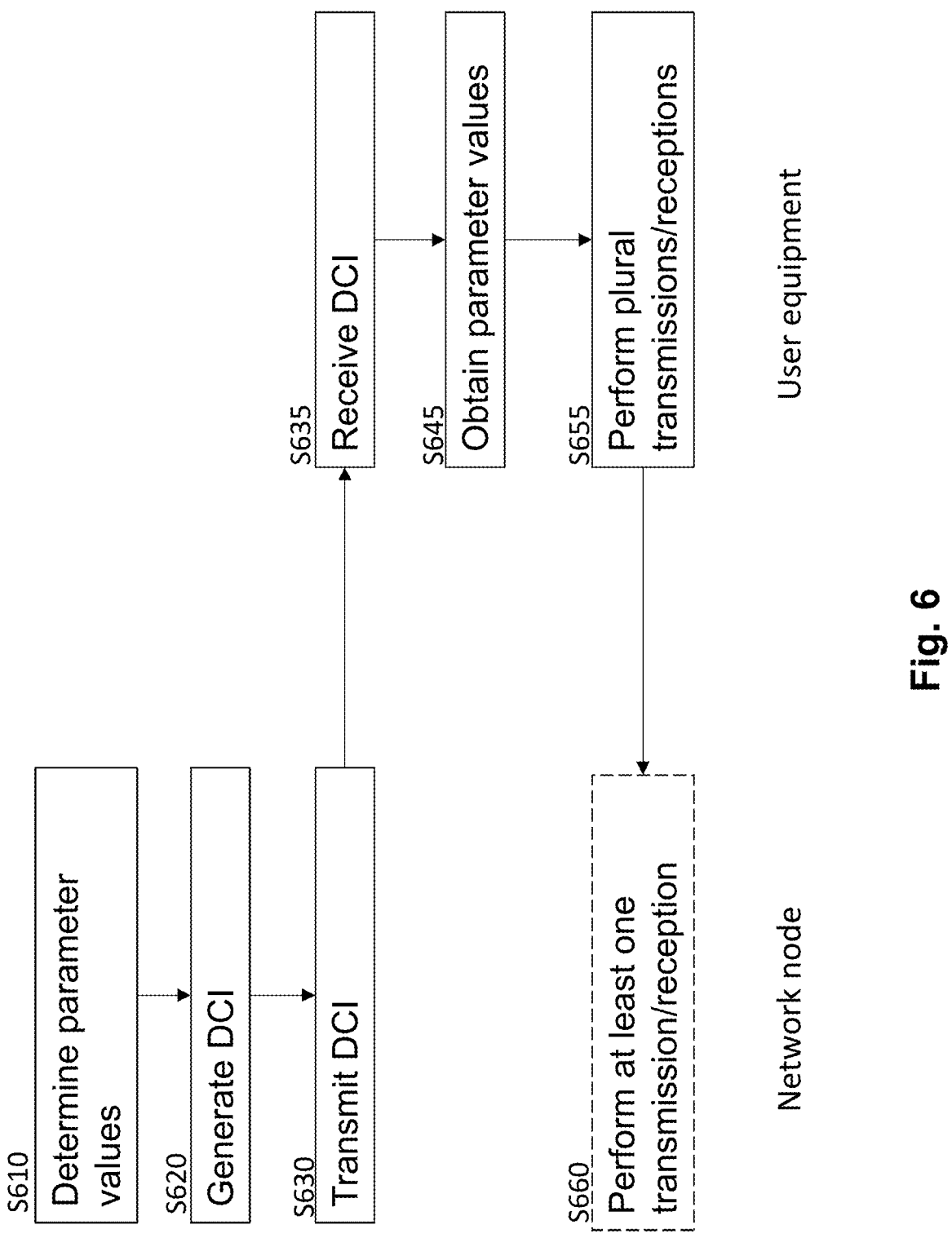
Figures 7, 8:
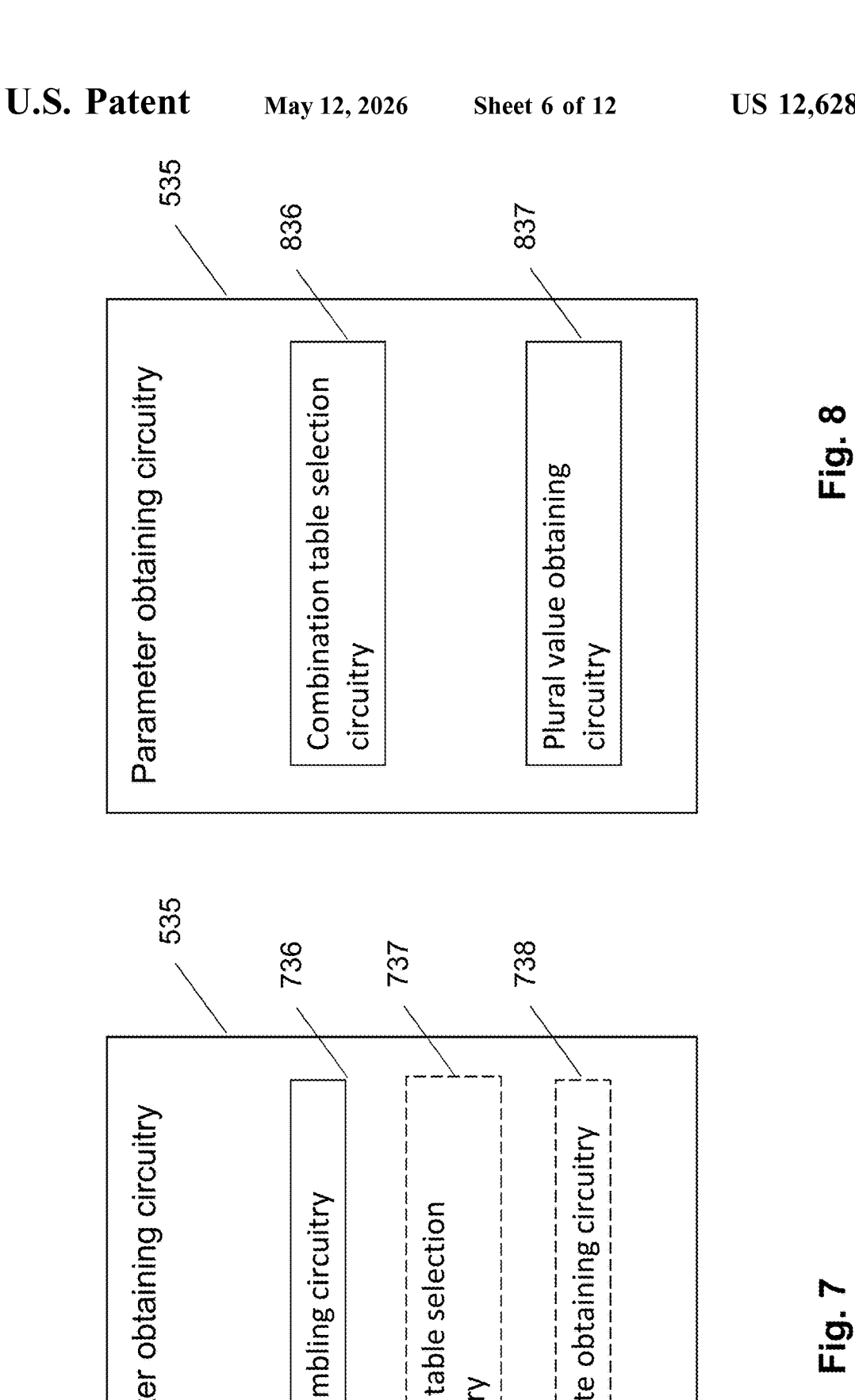

FIG. 1 shows an exemplary architecture for a 3GPP NR system including exemplary user and control plane architecture for the LTE eNB, gNB, and UE;

FIG. 2 shows an exemplary illustration of transmission of two PDSCHs to a single UE;

FIG. 3 shows an exemplary illustration of a single PDCCH transmission from one TRP scheduling two PDSCH transmissions from two TRPs;

FIG. 4 is a graph showing front-loaded demodulation reference symbol configurations for data channels;

FIG. 5 is a block diagram showing the structure of UE and of a network node;

FIG. 6 is a flow chart showing a method for a UE and a method for a network node;

FIG. 7 is a block diagram showing an exemplary structure of UE parameter obtaining circuitry;

FIG. 8 is a block diagram showing an exemplary structure of UE parameter obtaining circuitry;

FIG. 9 is an example of RRC code including values of a multi-TRP combination table;

FIG. 10 is an example of RRC code including values of a multi-TRP combination table for DMRS indication;

FIG. 11 is an example of RRC code including values of a multi-TRP combination table for TCI state indication;

FIG. 12 is an example of RRC code including an enabling parameter for a multi-TRP combination table;

FIG. 13 is an example of RRC code including an enabling parameter for a multi-TRP combination table for DMRS indication; and FIG. 14 is an example of RRC code including an enabling parameter for multi-TRP combination table for TCI state indication.

DETAILED DESCRIPTION

FIG. 1 shows an exemplary example of a communication system including a base station and a terminal and a core network. Such communication system may be a 3GPP system such as NR and/or LTE and/or UMTS. For example, as illustrated in FIG. 1, the base station (BS) may be a gNB (gNodeB, e.g., an NR gNB) or an eNB (eNodeB, e.g., an LTE gNB). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies. In NR, the Physical layer is based on time-frequency resources (such as Orthogonal Frequency Division Multiplexing, OFDM, similar to LTE) and may support multiple antenna operation.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals.

The physical layer in NR may provide multi-antenna operation such as MIMO (multiple input, multiple output) which may, for instance, include the use of plural or multiple transmission and reception points (multi-TRP). For instance, a user equipment may receive data from plural TRPs (transmission and reception points), wherein the plural-TRPs may be controlled by the same or different network nodes. The terms multi-point transmission or coordinated multi-point transmission (COMP) may also be used for multi-TRP communication including multi-TRP transmission.

In 3rd generation partnership project (3GPP) in new radio (NR) Rel. 15, basic support for multiple transmission and reception point (multi-TRP) was specified. In NR Rel. 16 multi-TRP may further be enhanced in accordance with a new work item on NR MIMO (cf. RP-182067, 'Revised WID (work item description): Enhancements on MIMO for NR', Samsung, 3GPP TSG RAN (Technical Specification Group Radio Access Network) Meeting #81, Gold Coast, Australia, Sep. 10-13, 2018).

The present disclosure deals with multi-TRP communication and proposes techniques related for instance to single PDCCH (physical downlink control channel) transmission, where a single PDCCH is used to schedule data or control channels such as PDSCH (physical downlink shared channel), PUSCH (physical uplink shared channel), or PUCCH (physical uplink control channel) for multiple TRPs. Some of the discussed techniques are related to DMRS port indication table for mapping demodulation reference signals (DMRS) ports to multiple layers for transmission on multiple TRPs and transmission configuration indication (TCI) state signaling for multiple TRPs. Signaling modifications related to both DMRS port indication and TCI state via single PDCCH for multi-TRP transmission/reception of data channels are discussed.

As mentioned, this disclosure is applicable to the area of multi-TRP in MIMO. Multi-TRP involves transmission/ reception from/to multiple points that are either connected to each other via ideal or non-ideal backhaul to be described below in more detail, for coordinating transmission and/or reception to some degree.

The technologies described in the present disclosure are not limited to a particular arrangement of TRPs, or a particular relationship between TRPs and gNBs. Accordingly, for instance, multi-TRP operation may be performed by a gNB having different antenna panels or radio heads corresponding to the TRPs and different radio frequency units operating with the respective antennas.

Moreover, in multi-TRP, several options are conceivable with respect to the positional relationship between TRPs, and the distance between two TRPs may vary. For instance, the TRPs may be close, so that a UE receives signals from these TRPs from a similar angle. However, TRPs may also be located at a rather far distance from each other, for instance at remote locations of a network cell. A UE being served by the two TRPs may receive and transmit the signaling from and to the respective TRPs on uncorrelated channels. Accordingly, gains in channel diversity may be optimally utilized.

For instance, multi-TRP may be categorized into two high-level categories. Namely, the distinction between the categories may be made with respect to the backhaul type of the backhaul link between two given TRPs. On the one hand, an ideal backhaul is a very high throughput and very low latency backhaul such as dedicated point-to-point connection using, e.g., optical fiber. An ideal backhaul is assumed to allow for communication between the TRPs with approximately or almost 0 ms delay (e.g., for LTE-A, technical report 3GPP TR 36.932 V15.0.0 (2018-06) mentions in section 6.1.3 a one-way latency of less the 2.5 us wherein, however, propagation delay in the fiber/cable is not included). On the other hand, a non-ideal backhaul is a backhaul such as DSL (Digital Subscriber Line), microwave, and other backhaul like relaying, and may for example involve finite (one-way) delays in the range of 2 ms or 5 ms for communication between the two given TRPs.

Apart from the categorization into ideal backhauls and non-ideal backhauls, a further categorization in multi-TRP MIMO technology may be made with respect to how baseband circuitry is shared between TRPs. For instance, while there are different RF (radio frequency) blocks for each of two given TRPs, the TRPs may share the same baseband circuitry. Therein, the link/backhaul between the RF blocks and the baseband circuitry may be ideal or non-ideal. Alternatively, there may be both different baseband and different RF blocks for each TRP. Therein, the respective links between baseband circuitries and RF blocks as well as the link between the different baseband circuitries may be ideal or non-ideal.

The present disclosure provides approaches which may facilitate multi-TRP operation and may particularly facilitate achieving reliability and robustness. The technologies disclosed may for instance facilitate satisfying the requirements of URLLC by utilizing multi-TRP communication, but are not limited to URLLC use cases. For instance, the technologies disclosed may also be applied to eMBB and mMTC use cases. The present disclosure is applicable to scenarios including one or both of ideal and non-ideal backhauls.

As mentioned above, multiple and far apart TRPs may allow for providing spatial diversity gains. The exploitation of these spatial diversity gains may in particular facilitate transmission and reception in a range of high frequencies where blockage for any of the links or wireless communication channels between a TRP and a UE is particularly possible. In view of this, the techniques disclosed herein may facilitate coordination between multiple points such as TRPs to schedule control channels and/or data channels.

An example of multi-TRP communication is shown in FIG. 2, where multiple physical downlink data channels are transmitted from two TRPs (that are, e.g., connected by ideal backhaul) to a single UE.

There can be different modes of transmission for multi-TRP depending up on how is the backhaul link between the TRPs and whether each TRP has its own control channel (PDCCH/PUCCH) and/or data channel (PDSCH/PUSCH).

According to some agreements of RAN1 #94b and RAN #95, different alternatives are being considered related to single and/or multiple PDCCH transmission for multi-TRP transmission, and it is agreed to down-select among the following options: support only for single PDCCH design (where multiple PDCCH design may be additionally provided); support only for multiple PDCCH design (where single PDCCH design may be additionally provided); and support for both multiple PDCCH and single PDCCH design. As a further option, design of a URLLC specific PDCCH, possibly including a specific PDCCH structure/ format or transmission scheme, may be designed. Aspects to be considered in the down-selection may include backhaul latency, downlink control overhead, specification impact (including RAN2 specs), UE complexity (related to power control, timing adjustment, and blind detection), DCI/UCI design, scheduler flexibility, intra-UE PUCCH/PUSCH transmission, Rel-15 PDCCH blockage probability, and CSI feedback.

The present disclosure may be applicable to single PDCCH transmission in multi-TRP. However, the PDCCH can schedule, e.g., PDSCH/PUSCH/PUCCH for multiple TRPs. As shown in FIG. 3, a single PDCCH (single DCI content) is transmitted from TRP1 to UE and it schedules respective PDSCHs (carrying respective codewords) transmitted from TRP1 and TRP2 to the UE. This means that single DCI content within the single PDCCH is applied to downlink data transmission from both the TRPs. Accordingly, one PDCCH transmitted from one of the TRPs schedules different code words (different PDCCHs). For instance, the respective code words transmitted to or received by two or more TRPs may be different or identical (e.g., to facilitate achieving spatial diversity gains). Furthermore, different layers of the same code word may be transmitted from multiple TRPs.

In NR Rel. 15, different DMRS (demodulation reference signal) configurations were specified for PDSCH/PUSCH, which are referred to as front-loaded DMRS, as they occupy the first one or two symbols of the data channel, e.g., the first one or more symbols of a slot. In particular, DMRS configuration type 1 and type 2 were specified. Each configuration has both 1-symbol and 2-symbol configuration. Accordingly, 4 different DMRS patterns were specified as shown in FIG. 4. In addition, further time domain patterns with additional DMRS symbols are also specified.

A reference signal pattern (RS) is transmitted from an antenna port (or port or DMRS port) at the base station. A port may be implemented either as a single physical transmit antenna (or TRP), or as a combination of multiple physical antenna elements. In either case, the signal transmitted from each antenna port is not designed to be further deconstructed by the UE receiver: the transmitted RS (in particular demodulation reference signal) corresponding to a given antenna port defines the antenna port from the point of view of the UE, and enables the UE to derive a channel estimate for all data transmitted on that antenna port, regardless of whether it represents a single radio channel from one physical antenna or a composite channel from a multiplicity of physical antenna elements together comprising the antenna port. For ports, see also section 8.2 of S. Sesia, I. Toufik and M, Baker, LTE: The UMTS Long Term Evolution, Second Edition.

Different ports may be distinguished from each other by resource components such as cyclic shifts, combs (a comb defines a distinction of subcarriers, subcarriers with alternating subcarrier indices being grouped to different combs), and orthogonal cover codes (OCC). As can be seen from FIG. 4, ports are divided into CDM (code division multiplexing) groups, wherein each CDM group uses a respective OCC (such as, in the case of two-symbol DMRS, Walsh-Hadamard TD (Time Division)-OCCs). The resource components may be combined to component sets, and the component sets assigned to ports.

All the DMRS ports within the same CDM group may be assumed to be quasi-co-located) (QCL), i.e., similar assumptions related to the channel correlation between those DMRS ports, for instance with respect to Doppler shift, Doppler spread, average delay, and delay spread, are made.

When a data channel transmission is scheduled, for example a PDSCH is scheduled, one or more layers are scheduled. The term spatial layer (or layer) refers to one of different streams generated by spatial multiplexing. A layer can be described as a mapping of symbols onto the transmit antenna ports. Each layer is identified by a precoding vector of size equal to the number of transmit antenna ports and can be associated with a radiation pattern. The rank of the transmission is the number of layers transmitted. A codeword is an independently encoded data block, corresponding to a single Transport Block (TB) delivered from the Medium Access Control (MAC) layer in the transmitter to the physical layer, and protected with a cyclic redundancy check (CRC). Generally, a layer is assigned per transmission time (TTI) interval which in LTE corresponds to the subframe. However, in NR, there can be different TTIs, depending on URLLC or eMBB. In particular, in NR the TTI can be a slot, mini-slot, or subframe. For layers, ranks, and codewords, see also section 11.2.2.2 of S. Sesia, I. Toufik and M, Baker, LTE: The UMTS Long Term Evolution, Second Edition.

In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.0.0 (2017 December)). However, assignment of time resources for transmission may also be non-slot based. In particular, the TTIs in non slot-based assignment may correspond to mini-slots rather than slots. I.e., one or more mini-slots may be assign to a requested transmission of data/control signaling. In non slot-based assignment, the minimum length of a TTI may conventionally be 2 OFDM symbols.

The layers are mapped to the DMRS port numbers using port indication tables that are specified in Chapter 7 of 3GPP TS 38.212 V15.2.0. For instance, DCI format 1-1 and format 0-1 are used for scheduling of PDSCH and PUSCH, respectively. Each of these formats contains a field called "antenna ports" which is used to indicate to these tables for layer-to-port mapping. The specification in NR Rel. 15 for mapping layers-to-ports is based on the assumption of single TRP transmission. This means that the table contains entries where the DMRS ports within the same CDM group are mapped to multiple layers for transmission on a single TRP. If this mapping is applied to multi-TRP transmissions, for instance if layer1 is transmitted on TRP1 and layer2 is transmitted on TRP2, then the DMRS port mapping for these two layers is such that the two ports are assumed to be QCL-ed. This kind of mapping may be applied for single TRP or multiple TRPs that are sufficiently close to each other, as the DMRS ports can be assumed to be QCL-cd.

However, for the case that multiple TRPs are located rather far from each other, and multiple layers are transmitted on different TRPs, the present disclosure proposes that the DMRS ports assigned to these layers are not QCL-ed due to the different geographical locations of the TRPs, i.e., not within the same CDM group. Therefore, either new tables with modified or additional entries may facilitate supporting non-QCL-ed DMRS port-to-layer mapping for multiple TRPs. Some other possible signaling modifications may further facilitate scheduling via single PDCCH.

In DCI format 1-1 (section 7.3.1.2.2 of 3GPP TS 38.212 V15.2.0), which is used for PDSCH scheduling, includes a field called transmission configuration indication (TCI) that is used to indicate one of the eight TCI states using 3 bits, if configured. A UE can be configured with a list of up to M TCI states of the configuration within the higher layer (higher layer in this context meaning a layer higher than the physical layer) parameter PDSCH-Config which is configured in the RRC (Radio Resource Control) signaling (in the example of the above mentioned DCI format 1-1, M=8 in correspondence with the maximum number of 3 bits in the TCI field). Each TCI state contains parameters for configuring a quasi co-location relationship between one or two downlink reference signals and the DM-RS ports of the PDSCH. Further information about the different QCL types and other relevant information can be found in section 5.1.5 of 3GPP TS 38.212 V15.2.0. Accordingly, a single PDCCH (single DCI) has up to 3 bits for TCI signaling to indicate one of the eight configured states that signals the QCL assumption for a TRP and assumes same QCL assumption for other TRPs scheduled by the given PDCCH. With this QCL assumption, the TCI state information that is signaled via DCI is applicable in particular to single TRP transmission, because the same QCL association might not be valid for one different TRPs that are located far apart from each other. Some modifications may facilitate supporting independent TCI state signaling for multiple TRPs using a single PDCCH. For instance, TRPs that are geographically located apart should have a different QCL assumption, hence an independent TCI state signaling for each TRP.

As shown in FIG. 5, the present disclosure provides a user equipment 510, which comprises a transceiver 520 (receiver/transmitter) and circuitry 530 (processing circuitry). The transceiver 520 (or "UE transceiver"), in operation, receives downlink control information (DCI) on a PDCCH for scheduling a plurality of transmissions or receptions between the UE and a plurality of transmission and reception points (TRPs, e.g., TRP1 and TRP2 shown in FIGS. 2 and 3) on a plurality of channels, wherein the DCI includes one or more indicators indicating one or more respective transmission parameters. The circuitry 530 (or "UE circuitry", which may include transmission parameter obtaining circuitry 535), in operation, obtains, based on the one or more indicators and on a configuration, a plurality of values respectively of the one or more transmission parameters. The UE transceiver 520 performs the plurality of transmissions or receptions using a respective one of the plurality of values of the one or more transmission parameters for each of the plurality of transmissions or receptions.

Further provided and also shown in FIG. 5 is a network node 560 comprising a transceiver 570 and circuitry 580. The circuitry 580 (or "network node circuitry", which may include transmission parameter determining circuitry 585), in operation, determines a plurality of values respectively of one or more transmission parameters for a plurality of transmissions and receptions between a plurality of transmission and reception points, TRPs, and a user equipment, UE, and generates downlink control information, DCI, for scheduling the plurality of transmissions or receptions, the DCI including one or more indicators indicating the one or more respective transmission parameters, wherein the one or more indicators, in combination with a configuration, indicate the plurality of values respectively of the one or more transmission parameters. The network node transceiver 570, in operation, transmits the DCI on a PDCCH.

As also shown in FIG. 5, the UE 510 and the network node 560 communicate with each other via at least one communication channel, e.g., a wireless channel or radio channel in a wireless or radio communication system such as NR, LTE, or LTE-A.

The transceiver (the UE transceiver 520 and the network node transceiver 570) comprises hardware such as one or more antennas and software which controls the transmission and/or reception performed by the hardware.

In correspondence with the above-disclosed UE and network node, the present disclosure further provides a communication method for a user equipment (a "UE method") and a communication method for a network node (a "network node method"). FIG. 6 shows method steps of the UE method and the network node method.

In step S610 of the network node method, a plurality of values respectively of one or more transmission parameters for a plurality of transmissions and receptions between a plurality of transmission and reception points, TRPs, and a user equipment, UE, are determined. In step S620 of the network node method, downlink control information (DCI) is generated for scheduling the plurality of transmissions or receptions. The DCI includes one or more indicators indicating the one or more respective transmission parameters, wherein the one or more indicators, in combination with a configuration, indicate the plurality of values respectively of the one or more transmission parameters. Further, in step S630 the DCI is transmitted on a PDCCH and, in step S635 of the UE method, received on the UE side. In UE method step S645, the plurality of respective values of the one or more transmission parameters are obtained based on the one or more indicator(s) and on the configuration. In UE method step S655, the plurality of transmissions or the plurality of receptions are performed using a respective one of the plurality of values of the one or more transmission parameters for each of the plurality of transmissions or receptions.

The techniques disclosed herein may facilitate signaling to indicate separate DMRS port-to-layer mapping and TCI state for multiple TRPs using a single PDCCH. For instance, it may be facilitated not to increase DCI overhead (or not to increase the DCI overhead significantly) with an increasing number of TRPs. Moreover, reuse of techniques from existing specifications may be facilitated. Furthermore, the techniques disclosed may facilitate providing scalability and flexibility in view of a possibly large number of TRPs. Moreover, URLLC communication may be facilitated.

In the following details and embodiments of the above-disclosed apparatuses and corresponding methods are provided.

The transmission (network node) and reception (UE) of the DCI on a PDCCH may be a single PDCCH in multi-TRP communication, as discussed above. For instance, the PDCCH schedules a plurality of transmissions/receptions each of which is performed respectively on one of a plurality of channels using one of the plurality of TRPs.

The DCI includes one or more indicators which respectively indicate one or more transmission parameters. In particular, the transmission parameters may be QCL-related transmission parameters. For example, the DCI may include one or both of the above-mentioned parameters TCI and an index of a configuration from a DMRS port indication table, and the value(s) of one or more of these parameters may be determined (network node) and obtained (UE).

The respective values of the one or more of the transmission parameters are obtainable or derivable based on the one or more of the transmission parameters. For example, one or more of the values is obtainable from a combination of the configuration and of the parameter in the DCI corresponding respectively to the value. Furthermore, the configuration may be a combination of a statically configured part (which may be defined in a standard) and a "semi-statically" configured part which is configured in higher-layer signaling such as RRC signaling. For instance, the semi-statically signaled configuration (or part of the configuration) includes an element or parameter which enables the use of a "multi-TRP" configuration which is provided in the configuration, possibly in addition to a "single-TRP" configuration.

The single-TRP configuration may include the above-mentioned configuration of the TCI state variable or the one or more port indication tables such as the above-mentioned port indication tables specified in Chapter 7 of 3GPP TS 38.212 V15.2.0 which may be referred to as single-TRP configuration tables. The multi-TRP configuration may include further port indication tables, e.g., tables that have been designed for the use in multi-TRP combination. These additional tables may be included in the static configuration or signaled via RRC.

There are several possibilities of combinations between combinations of the configuration and the parameter(s) included in the DCI. For instance, the multi-TRP configuration may provide additional pointers or parameters to the single-TRP configuration which may be included in an additionally configured table. Furthermore, for instance, the interpretation of the parameter in the DCI may be determined based on an enabling parameter or an RNTI (Radio Network Temporary Identifier) included in the configuration. Based on the enabling parameter or the RNTI (e.g., a particular RNTI among a plurality of configured RNTIs) used for scrambling (network node)/descrambling (UE) the CRC appended to the DCI, the UE determines one (e.g., single-TRP) or more (multi-TRP) values of the parameters in accordance with the single-TRP configuration, the multi-TRP configuration or a combination of the single-TRP configuration and the multi-TRP configuration such as plural pointers to the single-TRP configuration.

The UE transceiver 520, in operation, performs the plurality of transmissions to or from the plurality of TRPs using, for each of the transmissions, or at least for two among the plurality of transmissions, a respective value of the transmission parameter. For instance, the UE uses respective TCI state values for respective TRPs. Furthermore, as an example, the UE may use a respectively different DMRS port indication value for transmission or reception to/from each of the plurality of TRPs. The respective values of the transmission parameter (e.g., DMRS port indication and/or TCI state) for the different TRPs may differ in their QCL assumption.

The plurality of transmissions or receptions to or from the plural TRPs may be transmissions of the same data/code words or different data/code words. For instance the respective code words of two code words being transmitted/received may be the same or different. Moreover, the same data may be transmitted/received using the same or different MCS (modulation and coding scheme(s)) and/or redundancy version(s). Moreover, different layers of a single code word may be transmitted or received to/from different TRPs.

The plurality of transmissions or receptions may be uplink or downlink transmissions/receptions of data or control information on channels such as PDSCH, PUSCH, or PUCCH. E.g., either the UE transmits data and/or control information to a plurality of TRPs, or the plurality of TRPs transmit data and/or control information to the UE.

For instance, the plurality of transmissions or receptions scheduled by the DCI are uplink transmissions from the UE to a plurality of TRPs, or the plurality of transmissions are downlink transmissions from a plurality of TRPs to the UE. It is further possible that the plurality of transmissions/receptions scheduled by the DCI include one or more uplink transmissions as well as one or more downlink transmissions.

As mentioned, multi-TRP communication may include the case of each TRP respectively being provided with a RF block and baseband circuitry, and the case of one baseband circuitry being shared between a plurality of TRPs each of which comprises a respective RF block. Accordingly, the network node 560 include one or more TRPs. For instance, one or more TRPs are included in the network node transceiver 570. However, the plurality of TRPs may also include TRPs which are not included in the network node 560. For instance, the network node may determine value(s) for the transmission parameter(s) and transmit these values to another baseband circuitry, possibly included in another network node, via an ideal or non-ideal backhaul link. Alternatively, the network node may determine the transmission parameters by receiving control information over an ideal or non-ideal backhaul link from another network node/baseband circuitry.

Accordingly, in some embodiments, the network node transceiver 570, in operation, performs at least one of the plurality of transmissions or receptions using a respective one of the plurality of values of the one or more transmission parameters for each of the plurality of transmissions or receptions. The at least one transmission or reception is performed between the UE and at least one of the plurality of TRPs. Thus, in these embodiments, the network node method further contains a transmission or reception step S660 of performing at least one (one, more, or each) of the plurality of transmissions. Therein, one, more, or each of the plurality of TRPs are respectively used.

As mentioned, in some embodiments, the one or more transmission parameters include at least one of a DMRS, demodulation reference signal, port indication and a transmission configuration indication, TCI, state. Furthermore, the present disclosure provides several embodiments involving different elements such as RNTIs, or enabling parameters in RRC signaling, combination tables which may be signaled in RRC or be statically configured, and combinations of the aforementioned elements. In the following, some embodiments will be described in further detail.

RNTI-Based Embodiments

In some embodiments, the configuration includes a RNTI, or a RNTI is derivable from the configuration, which is used by the network node to scramble a CRC (cyclic redundancy check) appended to the DCI. The UE circuitry 530, in operation, descrambles the CRC appended to the DCI using the RNTI, wherein the RNTI indicates the value of at least one of the plurality of values of the transmission parameters, either alone or in combination with one of the indicators in the DCI signaling.

For example, the RNTI (in particular, the numerical value of the RNTI) may correspond to the value of the transmission parameter. E.g., there is a mapping between possible numerical values of the RNTI, at least one of the numerical values possibly being configured statically or in the RRC signaling, The DCI field of the same parameter may be used for the value of the parameter of a first transmission or reception to or from a first TRP, while the value indicated by the RNTI is a value of the parameter for a second transmission or reception to or from a second TRP. In addition or alternatively, the RNTI may indicate that for the same or another transmission parameter, the corresponding field in the DCI is to be interpreted as a value representing plural (e.g., two) values for the transmission parameter for a plurality of transmissions/receptions via plural TRPs, wherein the mapping between the value in the DCI and the plural values may be defined by a combination table included in the configuration.

Accordingly, the present disclosure provides some embodiments based on an RNTI based approach. Several possibilities are possible as to which RNTI is used in particular. For instance, either a new UE specific RNTI may be introduced for multi-TRP specific signaling, or a UE specific RNTI which already serves some function, such as a MCS-C-RNTI (MCS Cell RNTI), may be enhanced in functionality to additionally indicate multi-TRP specific signaling.

RNTI-based embodiments of the present disclosure may be implemented without additional DCI overhead. Rather than including different values of a given transmission parameter in the DCI, an additional value of a given parameter may be obtainable from the RNTI or from a table at which the RNTI points. At the same time, independent indication for different TRPs may be facilitated. Furthermore, a unified approach to distinct signaling issued, e.g., DMRS and TCI signaling, is provided as the RNTI may serve as an indicator for DMRS port indication, TCI state indication, both issues or some additional fields.

For instance, a new UE-specific RNTI is configured by RRC, or an existing RNTI such as MCS-C-RNTI is reused, e.g., provided with additional functionality, where the scrambling by this new RNTI implicitly indicates the usage of a different DMRS port indication table for multi-TRP, e.g., a multi-TRP DMRS port indication table different from a single-TRP DMRS port indication table, as discussed above; and/or the specific RNTI value that scrambles the DCI CRC (the CRC appended to the DCI) is used to indicate the TCI state for an additional TRP (e.g., a TRP not used for PDCCH transmission), where more than one values are configured for new RNTI or existing RNTI (or derivable from the configured or existing RNTI) with enhanced functionality.

Multi-TRP tables, such as DMRS port indication tables which are designed and specified for multi-TRP cases, may be defined in a standard.

In a communication method using an RNTI-based approach to multi-TRP indication, the following exemplary steps may be involved:

1. If the RRC does not configure the new RNTI or does not enhance (e.g., define additional functionality for) an existing RNTI, then an existing process is followed, e.g., existing signaling framework is used, for instance a process as used in single-TRP communication, possibly including a single-TRP DMRS port indication table.

2. If RRC configures this new RNTI or uses enhanced functionality of an existing RNTI, then further steps based on a result of descrambling the DCI CRC.

3. If DCI CRC is not scrambled with this RNTI, then existing process is followed, e.g., existing signaling framework is used.

4. If the DCI CRC is scrambled with one possible value of the this RNTI, then following procedure is followed a. New DMRS port mapping table is used b. Upon descrambling, UE identifies the RNTI value used for scrambling, and calculate the TCI state for a second TRP (different from the first TRP from which the DCI has been signalled on the PDCCH).

c. First TRP's TCI state is signalled via the existing bit field (one of the indicators) included in the DCI.

However, as will be further described in some exemplary embodiments, step a. may be taken alone and independent of steps b. and c. Furthermore, steps b. and c. may be performed without step a. In particular, depending on whether the multi-TRP RNTI is used i) for indication of new DMRS table for multi-TRP, ii) for indication of 2 or more TCI state values for 2 TRPs or multi-TRP, or iii) for indication of new DMRS table for multi-TRP the above-mentioned steps 1. to 4. of the multi-TRP communication method may vary. In cases i) and iii), the use of the existing framework includes use of a single-TRP DMRS port indication table. Moreover, in case i), step 4 includes step a., in case ii), step 4) includes steps b., and c., and in case iii), step 4) includes steps a) to c). Moreover, as mentioned above the RNTI is a dedicated RNTI or a given RNTI enhanced by multi-TRP functionality which is configured. In cases ii) and iii), KRNTI candidate values are configured or derivable from the configuration, as will be described further.

It should further be noted that, the present disclosure is not limited with respect to which kind of indicator (DCI bit field or RNTI) is applied to which TRP. For instance, in contrast to the above description, the bit field in the TCI may be applied to a TRP from which the PDCCH has not been transmitted, such as the above-mentioned second TRP. FIG. 7 shows an exemplary structure of parameter obtaining circuitry 535, including descrambling circuitry 736 and including at least one of table selection circuitry 737 and TCI state obtaining circuitry 738.

In some embodiments, the RNTI is used for an indication of a DMRS table for multi-TRP communication. Therein, the configuration includes a first DMRS port indication table and a second DMRS port indication table. The UE circuitry 530, in operation, descrambles a cyclic redundancy check, CRC, appended to the DCI using a radio network temporary identifier, RNTI, included in or derivable from the configuration. The RNTI indicates that the second DMRS port indication table is to be used for the at least one of the plurality of transmissions or receptions. The UE transceiver 520, in operation, performs, in accordance with a result of successfully performing the descrambling of the CRC using the RNTI, at least one of the plurality of transmissions or receptions using the second DMRS port indication table, wherein the indicator indicates the DMRS port indication from the second DMRS port indication table.

Table 1 is an exemplary DMRS port indication table which may be used for multi-TRP communication in the case of type1 DMRS configuration and a one-symbol length. Accordingly, Table 1 is an example of the above-mentioned second DMRS port indication table (or "multi-TRP port indication table"), whereas the first DMRS port indication table may be a "single-TRP" DMRS port indication table as mentioned above. As can be seen from FIG. 4, ports 0 and 1 are QCLed (since they are in the same CDM group), and ports 2 and 3 are QCLed as well. The column "Number of DMRS CDM groups without data" indicates the number of CDM groups on which reference signals (rather than data) are signaled or which are occupied by another UE for DMRS transmission/reception (and thus are without data for the given user equipment under consideration).

TABLE 1

DMRS port indication table
DMRS port indication table for type 1 config with 1 symbol
Codeword 0 enabled,
Codeword 1 disabled

| Value | Number of DMRS CDM group(s) without data | DMRS port(s) |
| --- | --- | --- |
| 0 | 1 | 0 |
| 1 | 1 | 1 |
| 3 | 2 | 0 |
| 4 | 2 | 1 |
| 5 | 2 | 2 |
| 6 | 2 | 3 |
| 7 | 2 | 0, 2 |
| 8 | 2 | 0, 3 |
| 9 | 2 | 1, 2 |
| 10 | 2 | 0-2 |
| 11 | 2 | 1-3 |
| 12 | 2 | 0-3 |
| 13-15 | Reserved | Reserved |

The column value includes indices of the different rows corresponding to DMRS configurations. A DMRS configuration from among the rows is dynamically scheduled to the UE by a four-bit field in the DCI. Accordingly, the DMRs port indication is one of the transmission parameters based on which the plurality of transmissions or receptions is performed. This four bit field is an indicator which indicates one of the indices corresponding to the "Value" column denoting a DMRS port indication from the table.

Accordingly, accordance with the result of successfully descrambling the CRC, the DMRS port indication to be used for the plurality of transmissions or receptions is derived from the second DMRS port indication table rather than the first DMRS port indication table if the RNTI used for the descrambling is the RNTI having the multi-TRP function-ality. In this case, the indicator in the DCI indicates an entry from the "value" column of the second rather than the first DMRS port indication table, and the value corresponds to a plurality of ports, as defined in the respective row in the "DMRS port(s)" column, which including a plurality of non-QCLed ports assigned respectively to a plurality of TRPs.

Moreover, Table 1 shows a case where only one code word is enabled (codeword1) is enabled. In such a case, different layers of the code word are transmitted or received to or from different TRPs. The rows indicated by values 7 to 12 (entries 7 to 12) may be used for multi-TRP transmissions or receptions. In rows 7 and 8, the indicated port combina-tions, (0,2) and (0,3), are both non-QCLed, and can thus be used for transmissions using two ports. Entries 10 to 12 each denote combinations including at least two QCLed ports. If these combinations are for three layers (entries 10, 11) or four layers (entry 12), QCLed ports are mapped to the same TRP whereas ports belonging to different CDM groups are mapped to different TRPs.

However, Table 1 is an example, and the present disclo-sure may be applied using different DMRS port indication tables. For instance, more than one code word may be enabled. In this case layers of different code words may be mapped to different TRPs.

As mentioned above, instead of or in combination with the previously described derivation of the DMRS port indication values, the result of successfully descrambling the RNTI may be used for indicating a TCI state of a transmis-sion or reception to or from one of the plurality of TRPs.

In some embodiments, the indicator included in the DCI indicates a first value from among the plurality of values of the TCI state. Moreover, the RNTI is one of K RNTI candidates, wherein a first of the K RNTI candidates is included in the configuration and the RNTI candidates are K subsequent integers respectively indicating K configured TCI states signaled by Radio Resource Control, RRC, and the UE circuitry 530, in operation, determines the first value of the TCI state based on the indicator and obtains a second value from among the plurality of values of the TCI state based on a result of successfully descrambling the CRC appended to the DCI using, as the RNTI, the RNTI candidate indicating the TCI state to be used as the second value from among the K TCI states.

In the embodiments where the RNTI indicates a TCI state for a transmission, the RNTI may or may not additionally indicate use of the second DMRS port table as described above.

The RNTI is one of a K candidates (K being an integer). Since K possible values are available which the RNTI may take (which the network node circuitry 580 may use to scramble the DCI CRC), the plurality of RNTI candidates may be considered a multi-valued (or multiple valued) RNTI or an RNTI configured with more than one values. The value of the TCI state for transmission or reception to/from the second TRP is determined based on a mapping between RNTI value candidates and (RRC) configured TCI states.

When the RNTI is configured with more than one value, the index value or parameter value of the second TCI state for transmission and reception point TRP2 may be calcu-lated as follows, while the value of TCI state for a trans-mission and reception point TRP1 is indicated by the indi-cator (bit field or bit map) included in the DCI. In the following description, it is assumed that K equals 8, but the value of K may in generally be greater (e.g., 16) or smaller (e.g., 4) than 8 and may vary in time in accordance with an RRC configuration:

The DCI CRC is scrambled by the network node circuitry 580 with one of these 8 values, such as value5, the 8 values constituting the plurality of K RNTI candidates.

The UE receives the DCI and starts de-scrambling the CRC, subsequently with value1, value2, value3, and so on, until it successfully descrambles the CRC using one of the values (such as value5).

The UE successfully descrambles the CRC with value5 and, for instance, performs mod function between value5 and 8 (performs a value5 mod 8 operation), to determine the value indicating the TCI state for the transmission or reception to or from TRP2.

Result of the mod function indicates to the TCI state from the RRC configured TCI states for TRP2.

In the above description, RNTI candidates are mapped to TCI state values by a mod (modulo) function. However, other functions or operations to determine the mapping of RNTIs and respective TCI states may be applied. For instance, a counter may be used by the UE which is incremented with each attempt of descrambling the DCI CRC.

Furthermore, as mentioned above, if none of the multi-TRP RNTI candidates allows for successfully descrambling the CRC, another possibly non-multi-TRP related process may be followed. For example, the DCI CRC may be scrambled by the network node by another configured non-multi-TRP related RNTI such as a C-RNTI not having additional multi-TRP functionality (a "non-multi-TRP-RNTI"). Accordingly, on the UE side, the transceiver 520 may perform one or more further attempts to descramble the DCI using a non-multi-TRP RNTI. The descrambling attempts with the multi-TRP RNTI candidate(s) may be performed before or, if necessary after the attempts using non-multi-TRP RNTIs. Using the multi-TRP RNTI candidates first may facilitate prioritizing TRP communication, for example if the channel characteristics are critical as to frequently require multi-TRP transmissions. On the other hand, using the non-multi TRP RNTI first may facilitate accelerating the processing or reducing the required processing in a case where single-TRP communication is likely.

In the following, it will be explained how the multiple RNTI candidates are configured. It may be sufficient that only an initial RNTI value (or RNTI candidate) is signaled to the UE via RRC. The UE may assume that K subsequent numbers (e.g., integers) of RNTI values also belong to this multi-valued RNTI or candidate set of K RNTI candidates and which can be used for scrambling the RNTI (the multi TRP RNTI or possibly, an enhanced C-RNTI) on the network node side. The exact number of the value K depends on the number of TCI states that are configured by dynamic or semi-static indication (in the RRC). Out of a total number of, e.g., 128 TCI states included in a static configuration (e.g., from a standard), the network node selects, e.g., 8 states and signals these 8 states via RRC to the UE. 8 may correspond to a maximum number of RRC configurable TCI states corresponding to the size of the bit field (e.g., 3 bits) in the DCI. For instance, in the example of one additional TRP, the number K of RNTIs may equal 8. A RNTI being derivable from the configuration thus includes the case in which the RNTI used for scrambling/successfully descrambling the DCI CRC is one of K adjacent/subsequent or otherwise related values, e.g., integer values that are obtainable/derivable from an initial RNTI signaled in the RRC configuration by a numerical operation such as incrementing or decrementing.

However, the K RNTI candidates may also indicate a plurality of values of TCI state, e.g., for a second TRP (TRP3) and a third TRP (TRP3). Then, if 4 states rather than an allowed maximum number of 8 states are RRC-configured, 16 respective RNTI candidates may be mapped to combinations of respective TCI states for TRP2 and RP3.

According to some embodiments, at least one of the indicator in the DCI and the RNTI indicates a multi-TRP TCI state, a multi-TRP TCI state comprising more than one TCI states for transmission or reception respectively to or from more than one TRP.

For instance, the multi-TRP state may be a combination of respective TCI states for a plurality of TRPs such as TRP2 and TRP3, as described above.

In another example, above-listed steps 1. to 4., or similar steps, are performed, wherein the TCI state index (the TCI transmission parameter included in the DCI) contains information about more than one TRP. Therein, the TCI states to be signaled via RRC may be configured differently.

For instance, a TCI index corresponding to the TCI state transmission parameter may be configured to indicate the TCI-state information for more than one TRPs. This may result in an increased number of indices, for instance, the DCI field for TCI indication may or may not be redefined to have more than 3 bits. In general, the exact number of configured multi-TRP TCI states may depend on the scenarios (e.g., the number of configured TRPs and/or the locations of TRPs with relative to the UE and relative to each other).

The TCI index may be configured to indicate the TCI state information for more than one TRPs by means of a table which maps the TCI index to more than one TCI state. Shown below are Table 2 and Table 3. Table 2 indicates TCI state indices for 1 additional TRP, and Table 3 indicates the TCI state for 2 additional TRPs.

TABLE 2

| TCI state indices for 1 (additional) TRP | |
| --- | --- |
| Index | TCI-State |
| 0 | State1 |
| 1 | State2 |
| 2 | State3 |
| 3 | State4 |
| 4 | State5 |
| 5 | State6 |
| 6 | State7 |
| 7 | State3 |

TABLE 3

| TCI states for 2 additional TRPs | | |
| --- | --- | --- |
| Index | TRPs combination | TCI-State |
| 0 | TRP2, TRP3 | State1, State2 |
| 1 | TRP2, TRP3 | State2, State5 |
| 2 | TRP2, TRP3 | State3, State0 |
| 3 | TRP2, TRP3 | State4, State3 |
| 4 | TRP2, TRP3 | State5, State6 |
| 5 | TRP2, TRP3 | State6, State1 |
| 6 | TRP2, TRP3 | State7, State8 |
| 7 | TRP2, TRP3 | State8, State7 |

The TCI state transmission parameter in the DCI, the RNTI value successfully descrambling the CRC, or both the TCI state transmission parameter and the RNTI value may, in accordance with a configuration possibly signaled in the RRC, point to a multi TRP TCI state table such as the Table 3 for two TRPs. Whether the DCI parameter and/or the RNTI are to be interpreted by the UE as pointing to a single TRP table (Table 2) or a multi-TRP table (Table 3) may be RRC configured.

Moreover as shown above, multi-TRP Table 3, in the column "TCI state", may point to the TCI states of Table 2. In these case, since Table 3 refers to (depends on) Table 2, tables of both types may be configured or signaled via RRC. Alternatively, multi-TRP states may also be defined in the standard and statically configured. In the latter case, a multi-TRP table may be configured in the RRC which does not refer to single TRP states from a single-TRP TCI table, but may rather refer to statically configured multi-TRP states (e.g., to indexes of multi-TRP states in the static configuration).

Combination Table Based Embodiments

Table 3 shown above maps index values to combinations of TCI states to be applied for combinations of TRPs. Therefore, Table 3 may be considered a combination table. In the following, several further examples and embodiments are disclosed in which combination tables are used to indicate values for multi-TRP communication. The disclosure shows the possibility to create or enable intermediate combination tables via RRC for multi-TRP signaling. A generic structure of the combination table may contains a number of indices wherein each index of a given table corresponds to a row and indicates a combination of different TRP IDs and a corresponding combination of indices of DCI bitmap field for a given parameter (such as DMRS port indication, TCI state, etc.). If the combination table is configured and enabled by RRC, then a corresponding bitmap in the DCI may be used to indicate the index of the new combination table instead of the original indication of the corresponding parameter/index (e.g., the index of the "value column of Table 1 or the "index column of Table 2") for the single TRP case.

Table 4 exemplifies a possible generic structure of a single-TRP indication Table, and Table 5 shows a generic structure of a multi-TRP combination table.

TABLE 4

| Generic structure of single-TRP indication table | |
| --- | --- |
| Index | Information for single TRP |
| 0 | InfoA |
| 1 | InfoB |
| 2 | . . . |
| 3 | . . . |
| . . . | . . . |
| . . . | . . . |
| Z | InfoW |

TABLE 5

| Generic structure of a multi-TRP combination table | | |
| --- | --- | --- |
| Index | TRP combinations | Combination of Index of existing table for X |
| 0 | TRP1 | 0 |
| 1 | TRP2 | 1 |
| 2 | TRP1, TRP2 | 0, 0 |
| 3 | . . . | |
| . . . | . . . | |
| . . . | . . . | |
| Z | TRP1, TRP2 | 2, 3 |

Examples of single-TRP parameter indication tables include DMRS port indication tables and TCI state indication tables (see Table 2). It should be noted that although single TRP parameter indication Table 4 has one column for "Information for single TRP", such information may be divided among more columns, e.g., in a DMRS port indication table including columns of information respectively about DMRS groups without data and DMRS ports.

A single-TRP parameter indication table, such as Table 4, may have Z rows (indices) in accordance with the size of the corresponding field in the DCI. The DCI field of Y bits is used to indicate parameter X, as shown in Table 4, wherein $2^Y >= Z$.

In the present disclosure, the term "single-TRP" is used to distinguish from tables or parameters that are particularly designed or configured for multi-TRP applications as described in this disclosure. For instance, "single-TRP" DMRS port indication tables from the standard, as mentioned above, may also to some extend be applicable to multi-TRP communication. Moreover, in some embodiments, the combination tables are combined with the single TRP tables to indicate parameter value indication. Single-TRP tables are also referred to as "existing" tables as they may be used for non-multi-TRP scenarios as well and as they need to be present ("existent") so that the combination tables can refer to them. Moreover, in Table 5, "X" denotes a given transmission parameter, e.g., a DMRS port indication of a TCI state, as indicated by the single-TRP indication table.

As can be seen, Table 3 satisfies the structure of generic combination Table 5 and can thus be considered an example of a multi-TRP combination table. Accordingly, the techniques shown in the section about "combination table based embodiments" may also be applied to combination Table 3 shown in the preceding section of this disclosure, for instance configuring, RRC signaling, enabling and indexing of the RRC combination table.

For instance, the combination table may contain 3 columns and Z indices (Z being the same number of indices as for the corresponding single-TRP parameter indication table), as can be seen from Table 5. The first column is the index to be signaled via the DCI. The second column is the combination of TRPs, e.g., the TRP sets respectively including one or more TRPs, corresponding to which the information for parameter X needs to be signaled. The third column is the combination of indices (a set of "value candidates") that point to the existing (single-TRP) table and indicate information for parameter X for the corresponding TRPs for that index.

In each row (set of mappings), the number of TRPs in the "TRP combinations" column (the second column) is the same as the number of indices in the "Combination of Index" column (the third column). E.g., the indexes in the third column correspond to the TRPs in the second column in the order of listing (the first value corresponds to the first TRP listed in the same row, the second value to the second TRP, and so on).

Moreover, the combination table may be referred to as an "intermediate" combination table because it is inserted in the chain/hierarchy of reference in an intermediate position which may for example be as follows: parameter in DCI→intermediate combination table→(multiple values of) single-TRP indication table→static configuration.

In some embodiments, the configuration includes a set of mappings between TRP sets and value candidate sets of value candidates of the one or more transmission parameters, and at least one of the one or more indicators indicator included in the DCI indicates, from among the set of mappings, the mapping between one among the TRP sets to be used as the plurality of TRPs and one among the value candidate sets to be used as the plurality of values of the one or more transmission parameters to be used for the plurality of transmissions or receptions.

Exemplary parameter obtaining circuitry 535 for embodiments where the configuration includes a set of mappings between TRP sets and value candidate sets is shown in FIG. 8. For instance, the parameter obtaining circuitry includes combination table selection circuitry (or combination table enabling circuitry) 836 and plural value obtaining circuitry 837.

For instance, the set of mappings between TRP sets and value candidate sets corresponds is defined by the intermediate combination table. Each row from the combination table may respectively define one mapping from among the set of mappings. The TRP sets correspond to the respective entries in the "TRP combination" column of the combination table. Based on an indication in the DCI (a value of the transmission parameter), one of the TRP sets is determined/obtained to become the plurality of TRPs used for transmission or reception, in association with the one or more of indices in the column "Combination of Index of existing table for X" from Table 5.

19

20

Furthermore, it can be seen that generic combination Table 5 includes entries of single TRPs (in the rows with indexes "0" and "1"). Accordingly, in addition to indicating a plurality of transmissions and receptions to or from multiple TRPs, the DCI signaling in combination with the combination table may indicate a single value for a given transmission parameter for a transmission or reception using a one TRP. A combination table including one or more rows referring to a single TRP may facilitate flexibly switching between different TRPs as well as switching between single TRP transmissions/receptions and multi-TRP transmissions/receptions.

As mentioned, the bit field for parameter X points to a row of the combination table, and the number of rows/indexes of the combination table may be the same or smaller than the number of rows of the parameter indication table (Table 4). Accordingly, embodiments using a set of mappings (a combination table) may be implemented without causing additional DCI overhead. However, the number of rows of the combination table may in general also be larger than the number of rows of the parameter indication table. In general, a flexible and scalable technique is provided which may facilitate communication between a UE and a large number of TRPs. Moreover, the set of mappings may be applicable for different DCI fields designed to be used for single-TRP applications or without consideration of the multi-TRP case, and one or more DCI fields at a time instance.

A combination table for a parameter X may be configured as a new table, and different alternatives (e.g., statically and dynamical) configuration may be applied.

In some embodiments, the set of mappings comprises M mappings from among N statically configured mappings, M being equal to or smaller than N, and the UE transceiver 520, in operation, receives M indices indicating respectively the M mappings which are signaled by the network node transceiver 570 via RRC, and the at least one indicator indicates the index which indicates the mapping between the plurality of TRPs and the plurality of values of the one or more transmission parameters to be used for the plurality of transmissions or receptions.

Accordingly, a combination table may be statically configured including a number N of rows corresponding to mappings between TRP set and parameter candidate sets and correspondingly, N indices that cover various combinations, (e.g., all possible combinations TRPs or a set of desired/required combinations of TRPs). The number N of statically configured indexes constitutes a superset of indexes.

The network node 560 then signals a (sub-)set of M indexes (M<=N) from among the superset of N indices. The set of M indices corresponds to the set of M mappings between TRP sets and value candidate sets from which the parameter to be used for the transmissions or receptions is selected and indicated by the DCI field. The network node dynamically indicates, using the DCI bit field for parameter X, one index of the (sub) set of mappings of to the UE, of which the UE is informed via RRC.

However, the combination table (rather than only a subset of indices of a statically configured combination table) may be signaled via RRC signaling. Independent of whether the combination table is statically or RRC configured, the combination table may have the structure of Table 5.

In some embodiments, content of a mapping table which defines the set of mappings between TRP sets and (index) value candidates, is signaled by RRC.

For instance, the RRC dynamically configures a new combination table which defines the set of mappings, and the entire table (e.g., lists of the entries of the respective columns) is signaled to the UE via RRC signaling. The length of the RRC-configured configuration table may vary depending, for example on the number of TRPs and on the scenario. The network node dynamically indicates, using the DCI bit field for parameter X, one index from the RRC-configured combination table to the UE.

For instance, the RRC signaling to indicate the list of indices in the new combination table for parameter X may be signaled in an information element "PDSCH-Config" of the RRC, as shown in FIG. 9, where the definition concerning parameter X is shown in bold. As further shown in the examples of FIGS. 10 and 11, parameter X may for instance be DMRs port indication and/or TCI state. It is through this information element that the content of each index of the combination table is informed to the UE(s), similar to other parameters also included in this information element. Through RRC signaling, the UE gets information including the number of indices of the combination table and the content of each index (corresponding sets of TRPs and the sets of value candidates (values of single-TRP indication table indices of the respective rows) of the combination table.

If no combination table is configured by a static configuration or by RRC, then a process may be followed in which the field in the DCI directly points to the (single-TRP) indication table such as a DMRS port indication table or a table of configured TCI states.

The format of the combination table may be statically defined including the number of columns and the information to be received in each column (the type of information included in each column, e.g., "TRP set" and "Combination of indices of existing table"). The format of the combination table (or combined table) may be static and the same regardless of the number of TRPs.

As mentioned, the PDSCH configuration element (PDSCH-Config) of the RRC indicates the number of indices and the content of each index. The number of indices and the content of the table (mappings between TRP sets and sets of value candidates) is different dependent on the number of TRPs to be included for which the combination table is used (the number of TRPs from which the respective TRP sets are selected/formed). However, the format of the table, including the number of columns and their interpretation, may be the same regardless of the number of TRPs for which a parameter X needs to be indicated. Thus, no additional signaling is needed to indicated how many TRPs are involved since the number of TRPs is implicit in the content of the combination table. Table 7 is an example of a combination table for a two-TRP case, and Table 8 is an example of a combination table for a four-TRP case.

TABLE 7

Two-TRP combination table for indication of parameter X

| Index | TRP combinations | Combination of Index of existing table for X |
|---|---|---|
| 0 | TRP1 | 0 |
| 1 | TRP2 | 1 |
| 2 | TRP1, TRP2 | 0, 0 |
| 3 | . . . | |
| . . . | . . . | |
| . . . | . . . | |
| M | TRP1, TRP2 | 2, 3 |

TABLE 8

Four-TRP combination table for indication of parameter X

| Index | TRP combinations | Combination of Index of existing table for X |
|-------|------------------|----------------------------------------------|
| 0 | TRP1 | 0 |
| 1 | TRP2 | 1 |
| 2 | TRP3 | 3 |
| 3 | TRP4 | 0 |
| 4 | TRP1, TRP4 | 1, 4 |
| 5 | TRP1, TRP2, TRP3 | 1, 4, 0 |
| 6 | TRP1, TRP2, TRP3, TRP4 | 5, 2, 3, 6 |
| . . . | . . . | |
| . . . | . . . | |
| L | TRP3, TRP4 | 1, 4 |

For some communication systems or scenarios, it may be determined or defined that if a combination table is configured (via RRC and/or static combination), then this combination table is to be used for indicating the values for a parameter X or more parameters. However, if a combination table is configured, different enabling mechanisms to enable the multi-TRP combination table to be used or not (e.g., to "switch" multi-TRP communication on or off) may be implemented.

For instance, parameter can be included in a PDCCH information element (IE) to indicate to the UE if the new combination table is to be used and the DCI bit field for a given parameter should point to this new combination table or not. For instance, as shown in FIG. 12 the presence of a combination table as well as enabling of use of this combination table may be signaled in the ControlResourceSet information element of the RRC signaling. The UE transceiver 520, in operation, receives an enabling parameter which indicates that the plurality of transmissions or receptions are to be performed based on the set of mappings and which is signaled by RRC, and the UE circuitry 530, in operation, determines, based on the enabling parameter, that the plurality of transmissions or receptions are to be performed based on the set of mappings.

Therein, "parameter_X" may be a parameter for DMRS port indication, TCI state indication, or some other parameter. As shown in FIG. 13, an enabling parameter such as DMRSPortMultiTRP-CombinedTableIndicationInDCI is used to inform the UE that combined table for multi-TRP is enabled that is used to point to existing DMRS port indication tables. As shown in FIG. 14, a parameter such as TCIStateMultiTRP-CombinedTableIndicationInDCI may be used to inform the UE that a combination table for multi-TRP is enabled that is used to point to TCI states (which may be defined in a single-TRP TCI state indication table).

It should be noted that the respective enabling parameter does not carry actual content/information of the respective combination table, it merely is an indication for enabling the use of the combination table. The actual content of the combination table may for instance be included in the PDSCH-Config information element, as described above.

However, there are further techniques with respect to how the presence of a combination table or the enabling of the use of the combination table may be conveyed to the UE. For instance, similar to the embodiments described in the preceding section, a UE specific RNTI may be newly configured, or an existing RNTI enhanced with additional functionality, to indicate the enabling of a combination table. If the DCI CRC is scrambled with this RNTI, then the UE assumes that the combination table is used and the bit field in the DCI for parameter X points to index of this combination table.

Accordingly, the UE circuitry 530, in operation, descrambles a CRC, appended to the DCI using a RNTI included in or derivable from the configuration, wherein the RNTI indicates that the plurality of transmissions or receptions are to be performed based on the set of mappings (e.g., the combination table), and determines, based on a result of successfully descrambling the CRC appended to the DCI using the RNTI, that the plurality of transmissions or receptions are to be performed based on the set of mappings.

Moreover, the functionality of the RNTI described in this section may be combined with the functionality of an RNTI described in the previous section disclosing the RNTI-based approach. For instance, a set of RNTI candidates being subsequent integers with which successive descrambling attempts by the UE are performed, rather than to a single TCI state indication table.

An example of DMRS port indication signaling using a combination table will be given in the following. Table 9 is a DMRS port indication table for configuration type 1 with 1-symbol length. The table has 16 indices. If a combination table for DMRS port indication, such as Table 10, is configured and enabled, instead of directly signaling the index of the DMRS port indication table, 4 bits (i.e., a four-bit DCI field for DMRS port indication) are used to indicate the index of the combination table on the right, that points to the DMRS port indication table for 2 TRPs. The Exact combinations, number of indices, etc., can be configured by RRC depending up on the scenario. Furthermore, it should be noted Table 10 merely illustrates an exemplary structure of a combination table and the values are not necessarily applicable for Table 9. Rather, the entries are to be understood as placeholders.

TABLE 9

DMRS port indication table
DMRS port indication table for type 1 config with 1symbol
Codeword 0 enabled,
Codeword 1 disabled

| Value | Number of DMRS CDM group(s) without data | DMRS port(s) |
|-------|------------------------------------------|--------------|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 10

Exemplary structure of DMRS combination table
2-TRP combination table for DMRS port indication

| Value | Multi-TRP IDs | Indices of DMRS port indication table |
|-------|---------------|----------------------------------------|
| 0 | 1 | 0 |
| 1 | 1, 2 | 0, 1 |
| 2 | 2 | 3 |

TABLE 10-continued

Exemplary structure of DMRS combination table
2-TRP combination table for DMRS port indication

| Value | Multi-TRP IDs | Indices of DMRS port indication table |
|---|---|---|
| 3 | 1 | 5 |
| 4 | 1 | 1 |
| 5 | 2 | 1 |
| 6 | 2 | 3 |
| 7 | 1, 2 | 1, 4 |
| 8 | 1, 2 | 1, 6 |
| 15 | . . . | . . . |

Furthermore, as mentioned, a combination table may be used for multi-TRP TCI state signaling. Table 11 shows an indication table usable for up to eight TCI states. An existing TCI bit field with 3 bits can indicate one of the eight configured states of Table 11 for one TRP if a TCI state combination table is not enabled. However, if a TCI state combination table such as Table 12 is enabled, instead of directly signaling the index of the TCI state, the 3 bits in the DCI used to indicate the index of the combination table (Table 12), that points to the TCI states for 2 TRPs (e.g., two separate states from Table 11). The exact combinations (as well as which of the total available statically configured TCI states are to be activated), number of indices, etc., can be configured by RRC depending up on the scenario.

TABLE 11

TCI state indication table
TCI state signaling for up to 8 states

| Value | TCI state |
|---|---|
| 0 | State 1 |
| 1 | State 2 |
| 2 | State 3 |
| 3 | State 4 |
| 4 | State 5 |
| 5 | State 6 |
| 6 | State 7 |
| 7 | State 8 |

TABLE 12

Exemplary structure of TCI state combination table.
2-TRP combination table for TCI state signaling

| Value | Multi-TRP IDs | Indices of TCI states |
|---|---|---|
| 0 | 1 | 0 |
| 1 | 1, 2 | 0, 1 |
| 2 | 2 | 3 |
| 3 | 1 | 5 |
| 4 | 1 | 1 |
| 5 | 2 | 1 |
| 6 | 2 | 3 |
| 7 | 1, 2 | 1, 4 |

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The present disclosure provides a user equipment, UE, comprising a transceiver which, in operation, receives, on a physical downlink control channel, PDCCH, downlink control information, DCI, for scheduling a plurality of transmissions or receptions between the UE and a plurality of transmission and reception points, TRPs, on a plurality of channels, the DCI including one or more indicators indicating one or more respective transmission parameters, and circuitry which, in operation, obtains, based on the one or more indicators and on a configuration, a plurality of values respectively of the one or more transmission parameters, wherein the transceiver, in operation, performs the plurality of transmissions or receptions using a respective one of the plurality of values of the one or more transmission parameters for each of the plurality of transmissions or receptions.

In some embodiments, the one or more transmission parameters include at least one of a DMRS, demodulation reference signal, port indication and a transmission configuration indication, TCI, state.

In some embodiments, the configuration includes a RNTI, radio network temporary identifier, or the RNTI is derivable from the configuration, and the UE circuitry, in operation, descrambles a CRC appended to the DCI using the RNTI, wherein the RNTI indicates the value of at least one of the plurality of values of the transmission parameters, either alone or in combination with the at least one indicator in the DCI signaling.

In some embodiments, the configuration includes a first DMRS port indication table and a second DMRS port indication table, the circuitry, in operation, descrambles a cyclic redundancy check, CRC, appended to the DCI using a radio network temporary identifier, RNTI, included in or derivable from the configuration, wherein the RNTI indicates that the second DMRS port indication table is to be used for the at least one of the plurality of transmissions or receptions, and the transceiver, in operation, performs, in accordance with a result of successfully performing the descrambling of the CRC using the RNTI, at least one of the plurality of transmissions or receptions using the second DMRS port indication table, wherein the indicator indicates the DMRS port indication from the second DMRS port indication table.

For instance, the indicator indicates a first value from among the plurality of values of the TCI state, the RNTI is one of K RNTI candidates, wherein a first of the K RNTI candidates is included in the configuration and the RNTI candidates are K subsequent integers respectively indicating K configured TCI states signaled by Radio Resource Control, RRC, and the circuitry, in operation, determines the first value of the TCI state based on the indicator and obtains a second value from among the plurality of values of the TCI state based on a result of successfully descrambling the CRC appended to the DCI using, as the RNTI, the RNTI candidate indicating the TCI state to be used as the second value from among the K TCI states.

For instance, the indicator indicates a first value from among the plurality of values of the TCI state, the circuitry, in operation, descrambles a cyclic redundancy check, CRC, appended to the DCI using a radio network temporary identifier, RNTI, included in or derivable from the configuration, the RNTI is one of K RNTI candidates, wherein a first of the K RNTI candidates is included in the configuration and the RNTI candidates are K subsequent integers respectively indicating K configured TCI states signaled by RRC, and the circuitry, in operation, determines the first value of the TCI state based on the indicator and obtains a second value from among the plurality of values of the TCI state based on a result of successfully descrambling the CRC appended to the DCI using, as the RNTI, the RNTI candidate indicating the TCI state to be used as the second value from among the K TCI states.

According to some embodiments, at least one of the indicator and the RNTI indicates a multi-TRP TCI state, a multi-TRP TCI state comprising more than one TCI states for transmission or reception respectively to or from more than one TRP.

In some embodiments, the configuration includes a set of mappings between TRP sets and value candidate sets of value candidates of the one or more transmission parameters, and at least one of the one or more indicators indicates, from among the set of mappings, the mapping between one among the TRP sets to be used as the plurality of TRPs and one among the value candidate sets to be used as the plurality of values of the one or more transmission parameters to be used for the plurality of transmissions or receptions.

In some embodiments, the set of mappings comprises M mappings from among N statically configured mappings, M being equal to or smaller than N, and the transceiver, in operation, receives M indices indicating respectively the M mappings which are signaled by RRC, and the at least one indicator indicates the index which indicates the mapping between the plurality of TRPs and the plurality of values of the one or more transmission parameters to be used for the plurality of transmissions or receptions.

In some embodiments, the transceiver, in operation, receives content of a mapping table which defines the set of mappings, the content of the mapping table being signaled by RRC.

For example, the transceiver, in operation, receives an enabling parameter which indicates that the plurality of transmissions or receptions are to be performed based on the set of mappings and which is signaled by RRC, and the circuitry, in operation, determines, based on the enabling parameter, that the plurality of transmissions or receptions are to be performed based on the set of mappings.

For instance, the circuitry, in operation, descrambles a cyclic redundancy check, CRC, appended to the DCI using a radio network temporary identifier, RNTI, included in or derivable from the configuration, wherein the RNTI indicates that the plurality of transmissions or receptions are to be performed based on the set of mappings, and determines, based on a result of successfully descrambling the CRC appended to the DCI using the RNTI, that the plurality of transmissions or receptions are to be performed based on the set of mappings.

In some embodiments, the transceiver, in operation, receives a signal including the RRC.

The present disclosure further provides a network node comprising circuitry which, in operation, determines a plurality of values respectively of one or more transmission parameters for a plurality of transmissions and receptions between a plurality of transmission and reception points, TRPs, and a user equipment, UE, on a plurality of channels and generates downlink control information, DCI, for scheduling the plurality of transmissions or receptions, the DCI including one or more indicators indicating the one or more respective transmission parameters, wherein the one or more indicators, in combination with a configuration, indicate the plurality of values respectively of the one or more transmission parameters, and a transceiver which, in operation, transmits the DCI on a physical downlink control channel, PDCCH.

For example, the transceiver, in operation, performs at least one of the plurality of transmissions or receptions using a respective one of the plurality of values of the one or more transmission parameters for each of the plurality of transmissions or receptions.

In some embodiments, the one or more transmission parameters include at least one of a DMRS, demodulation reference signal, port indication and a transmission configuration indication, TCI, state.

In some embodiments, the configuration includes a RNTI, radio network temporary identifier, or the RNTI is derivable from the configuration, and the network node circuitry, in operation, scrambles a CRC appended to the DCI using the RNTI, wherein the RNTI indicates the value of at least one of the plurality of values of the transmission parameters, either alone or in combination with the at least one indicator in the DCI signaling.

In some embodiments, configuration includes a first DMRS port indication table and a second DMRS port indication table, the circuitry, in operation, scrambles a cyclic redundancy check, CRC, appended to the DCI using a radio network temporary identifier, RNTI, included in or derivable from the configuration, wherein the RNTI indicates that the second DMRS port indication table is to be used for at least one of the plurality of transmissions or receptions.

In some embodiments, the indicator indicates a first value from among the plurality of values of the TCI state, and the RNTI is one of K RNTI candidates, wherein a first of the K RNTI candidates is included in the configuration and the RNTI candidates are K subsequent integers respectively indicating K configured TCI states signaled by Radio Resource Control, RRC.

According to some embodiments, at least one of the indicator and the RNTI indicates a multi-TRP TCI state, a multi-TRP TCI state comprising more than one TCI states for transmission or reception respectively to or from more than one TRP.

In some embodiments, the configuration includes a set of mappings between TRP sets and value candidate sets of value candidates of the one or more transmission parameters, and at least one of the one or more indicators indicates, from among the set of mappings, the mapping between one among the TRP sets to be used as the plurality of TRPs and one among the value candidate sets to be used as the plurality of values of the one or more transmission parameters to be used for the plurality of transmissions or receptions.

In some embodiments, the set of mappings comprises M mappings from among N statically configured mappings, M being equal to or smaller than N, and the transceiver, in operation, transmits M indices indicating respectively the M mappings which are signaled by RRC, and the at least one indicator indicates the index which indicates the mapping between the plurality of TRPs and the plurality of values of the one or more transmission parameters to be used for the plurality of transmissions or receptions.

In some embodiments, the transceiver, in operation, transmits content of a mapping table which defines the set of mappings, the content of the mapping table being signaled by RRC.

For example, the transceiver, in operation, transmits an enabling parameter which indicates that the plurality of transmissions or receptions are to be performed based on the set of mappings and which is signaled by RRC.

For instance, the circuitry, in operation, scrambles a cyclic redundancy check, CRC, appended to the DCI using a radio network temporary identifier, RNTI, included in or derivable from the configuration, wherein the RNTI indicates that the plurality of transmissions or receptions are to be performed based on the set of mappings.

In some embodiments, the transceiver, in operation, transmits a signal including the RRC.

The present disclosure further provides a communication method for a user equipment, comprising receiving, on a physical downlink control channel, PDCCH, downlink control information, DCI, for scheduling a plurality of transmissions or receptions between the UE and a plurality of transmission and reception points, TRPs, on a plurality of channels, the DCI including one or more indicators indicating one or more respective transmission parameters, obtaining, based on the one or more indicators and on a configuration, a plurality of values respectively of the one or more transmission parameters, and performing the plurality of transmissions or receptions using a respective one of the plurality of values of the one or more transmission parameters for each of the plurality of transmissions or receptions.

In some embodiments, the one or more transmission parameters include at least one of a DMRS, demodulation reference signal, port indication and a transmission configuration indication, TCI, state.

In some embodiments, the configuration includes a RNTI, radio network temporary identifier, or the RNTI is derivable from the configuration, and the method includes descrambling a CRC appended to the DCI using the RNTI, wherein the RNTI indicates the value of at least one of the plurality of values of the transmission parameters, either alone or in combination with the at least one indicator in the DCI signaling.

In some embodiments, the configuration includes a first DMRS port indication table and a second DMRS port indication table, the method includes descrambling a cyclic redundancy check, CRC, appended to the DCI using a radio network temporary identifier, RNTI, included in or derivable from the configuration, wherein the RNTI indicates that the second DMRS port indication table is to be used for the at least one of the plurality of transmissions or receptions, and performing, in accordance with a result of successfully performing the descrambling of the CRC using the RNTI, at least one of the plurality of transmissions or receptions using the second DMRS port indication table, wherein the indicator indicates the DMRS port indication from the second DMRS port indication table.

For instance, the indicator indicates a first value from among the plurality of values of the TCI state, the RNTI is one of K RNTI candidates, wherein a first of the K RNTI candidates is included in the configuration and the RNTI candidates are K subsequent integers respectively indicating K configured TCI states signaled by Radio Resource Control, RRC, and the method includes descrambling the first value of the TCI state based on the indicator and obtains a second value from among the plurality of values of the TCI state based on a result of successfully descrambling the CRC appended to the DCI using, as the RNTI, the RNTI candidate indicating the TCI state to be used as the second value from among the K TCI states.

For instance, the indicator indicates a first value from among the plurality of values of the TCI state, the method includes descrambling a cyclic redundancy check, CRC, appended to the DCI using a radio network temporary identifier, RNTI, included in or derivable from the configuration, the RNTI is one of K RNTI candidates, wherein a first of the K RNTI candidates is included in the configuration and the RNTI candidates are K subsequent integers respectively indicating K configured TCI states signaled by RRC, and the method includes determining the first value of the TCI state based on the indicator and obtains a second value from among the plurality of values of the TCI state based on a result of successfully descrambling the CRC appended to the DCI using, as the RNTI, the RNTI candidate indicating the TCI state to be used as the second value from among the K TCI states.

According to some embodiments, at least one of the indicator and the RNTI indicates a multi-TRP TCI state, a multi-TRP TCI state comprising more than one TCI states for transmission or reception respectively to or from more than one TRP.

In some embodiments, the configuration includes a set of mappings between TRP sets and value candidate sets of value candidates of the one or more transmission parameters, and at least one of the one or more indicators indicates, from among the set of mappings, the mapping between one among the TRP sets to be used as the plurality of TRPs and one among the value candidate sets to be used as the plurality of values of the one or more transmission parameters to be used for the plurality of transmissions or receptions.

In some embodiments, the set of mappings comprises M mappings from among N statically configured mappings, M being equal to or smaller than N, and method includes receiving M indices indicating respectively the M mappings which are signaled by RRC, and the at least one indicator indicates the index which indicates the mapping between the plurality of TRPs and the plurality of values of the one or more transmission parameters to be used for the plurality of transmissions or receptions.

In some embodiments, the method includes receiving content of a mapping table which defines the set of mappings, the content of the mapping table being signaled by RRC.

For example, the method includes receiving an enabling parameter which indicates that the plurality of transmissions or receptions are to be performed based on the set of mappings and which is signaled by RRC, and determining, based on the enabling parameter, that the plurality of transmissions or receptions are to be performed based on the set of mappings.

For instance, the method includes descrambling a cyclic redundancy check, CRC, appended to the DCI using a radio network temporary identifier, RNTI, included in or derivable from the configuration, wherein the RNTI indicates that the plurality of transmissions or receptions are to be performed based on the set of mappings, and determines, based on a result of successfully descrambling the CRC appended to the DCI using the RNTI, that the plurality of transmissions or receptions are to be performed based on the set of mappings.

In some embodiments, the method includes receiving a signal including the RRC.

Moreover, the present disclosure provides a communication method for a network node, comprising determining a plurality of values respectively of one or more transmission parameters for a plurality of transmissions and receptions between a plurality of transmission and reception points, TRPs, and a user equipment, UE, on a plurality of channels, generating downlink control information, DCI, for scheduling the plurality of transmissions or receptions, the DCI including one or more indicators indicating the one or more respective transmission parameters, wherein the one or more indicators, in combination with a configuration, indicate the plurality of values respectively of the one or more transmission parameter, and transmitting the DCI on a physical downlink control channel, PDCCH.

For example, the method comprises performing at least one of the plurality of transmissions or receptions using a respective one of the plurality of values of the one or more transmission parameters for each of the plurality of transmissions or receptions.

In some embodiments, the one or more transmission parameters include at least one of a DMRS, demodulation reference signal, port indication and a transmission configuration indication, TCI, state.

In some embodiments, the configuration includes a RNTI, radio network temporary identifier, or the RNTI is derivable from the configuration, and the method includes scrambling a CRC appended to the DCI using the RNTI, wherein the RNTI indicates the value of at least one of the plurality of values of the transmission parameters, either alone or in combination with the at least one indicator in the DCI signaling.

In some embodiments, configuration includes a first DMRS port indication table and a second DMRS port indication table, and the method includes scrambling a cyclic redundancy check, CRC, appended to the DCI using a radio network temporary identifier, RNTI, included in or derivable from the configuration, wherein the RNTI indicates that the second DMRS port indication table is to be used for at least one of the plurality of transmissions or receptions.

In some embodiments, the indicator indicates a first value from among the plurality of values of the TCI state, and the RNTI is one of K RNTI candidates, wherein a first of the K RNTI candidates is included in the configuration and the RNTI candidates are K subsequent integers respectively indicating K configured TCI states signaled by Radio Resource Control, RRC.

According to some embodiments, at least one of the indicator and the RNTI indicates a multi-TRP TCI state, a multi-TRP TCI state comprising more than one TCI states for transmission or reception respectively to or from more than one TRP.

In some embodiments, the configuration includes a set of mappings between TRP sets and value candidate sets of value candidates of the one or more transmission parameters, and at least one of the one or more indicators indicates, from among the set of mappings, the mapping between one among the TRP sets to be used as the plurality of TRPs and one among the value candidate sets to be used as the plurality of values of the one or more transmission parameters to be used for the plurality of transmissions or receptions.

In some embodiments, the set of mappings comprises M mappings from among N statically configured mappings, M being equal to or smaller than N, and method includes transmitting M indices indicating respectively the M mappings which are signaled by RRC, and the at least one indicator indicates the index which indicates the mapping between the plurality of TRPs and the plurality of values of the one or more transmission parameters to be used for the plurality of transmissions or receptions.

In some embodiments, the method includes transmitting content of a mapping table which defines the set of mappings, the content of the mapping table being signaled by RRC.

For example, the method includes transmitting an enabling parameter which indicates that the plurality of transmissions or receptions are to be performed based on the set of mappings and which is signaled by RRC.

For instance, the method includes scrambling a cyclic redundancy check, CRC, appended to the DCI using a radio network temporary identifier, RNTI, included in or derivable from the configuration, wherein the RNTI indicates that the plurality of transmissions or receptions are to be performed based on the set of mappings.

In some embodiments, the method includes transmitting a signal including the RRC.

Summarizing, the present disclosure relates to a user equipment (UE), a network node, and communication methods respectively for a UE and a network node. The UE comprises a transceiver which, in operation, receives, on a physical downlink control channel, PDCCH, downlink control information, DCI, for scheduling a plurality of transmissions or receptions between the UE and a plurality of transmission and reception points, TRPs, on a plurality of channels, the DCI including one or more indicators indicating one or more respective transmission parameters, and circuitry which, in operation, obtains, based on the one or more indicators and on a configuration, a plurality of values respectively of the one or more transmission parameters. The transceiver, in operation, performs the plurality of transmissions or receptions using a respective one of the plurality of values of the one or more transmission parameters for each of the plurality of transmissions or receptions.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:
circuitry, which, in operation, determines, based on one or more downlink control information (DCI) indicators and on a configuration associated with a transmission configuration indication (TCI) field, one or more transmission parameters;
a transceiver, which, in operation, performs receptions on a physical downlink shared channel (PDSCH) using the one or more transmission parameters,
wherein
the one or more transmission parameters are determined in reference to a first table for the PDSCH in a case the configuration associated with the TCI field is for a single state,
the one or more transmission parameters are determined in reference to a second table for the PDSCH different from the first table for the PDSCH in a case the configuration associated with the TCI field is for multiple states, and
indices in the second table are represented by the same number of bits used to represent indices in the first table.

2. The UE according to claim 1, wherein the one or more transmission parameters includes a value of DMRS (demodulation reference signal) antenna ports.

3. The UE according to claim 1, wherein a number of entries in the second table is larger than a number of entries in the first table.

4. The UE according to claim 1, wherein an entry modified or added in the second table relative to the first table indicates multiple DMRS (demodulation reference signal) antenna ports.

5. The UE according to claim 1, wherein a subset of values of the TCI field is used to indicate the single state, and other values of the TCI field are used to indicate the multiple states.

6. The UE according to claim 1, wherein the second table is enabled in a case one code word is enabled.

7. The UE according to claim 1, wherein the second table indicates a number of DMRS (demodulation reference signal) CDM (code division multiplexing) groups without data and indicates DMRS ports.

8. The UE according to claim 1, wherein values of entries in the second table relate to a single DMRS (demodulation reference signal) antenna port, and values of other entries in the second table relate to multiple DMRS antenna ports.

9. The UE according to claim 1, wherein twelve entries indexed 0-11 in the second table are included in the first table and indexed 0-11, while an entry indexed 12 in the second table is not included in the first table.

10. The UE according to claim 1, wherein the indices are represented by 4 bits in the first table and the second table.

11. A communication method performed by a user equipment (UE), comprising:
determining, based on one or more downlink control information (DCI) indicators and on a configuration associated with a transmission configuration indication (TCI) field, one or more transmission parameters; and
performing receptions on a physical downlink shared channel (PDSCH) using the one or more transmission parameters,
wherein
the one or more transmission parameters are determined in reference to a first table for the PDSCH in a case the configuration associated with the TCI field is for a single state,
the one or more transmission parameters are determined in reference to a second table for the PDSCH different from the first table for the PDSCH in a case the configuration associated with the TCI field is for multiple states, and
indices in the second table are represented by the same number of bits used to represent indices in the first table.

12. An integrated circuit comprising:
a processing circuit configured to control a process of a user equipment (UE), the process comprising:
determining, based on one or more downlink control information (DCI) indicators and on a configuration associated with a transmission configuration indication (TCI) field, one or more transmission parameters; and
performing receptions on a physical downlink shared channel (PDSCH) using the one or more transmission parameters,
wherein
the one or more transmission parameters are determined in reference to a first table for the PDSCH in a case the configuration associated with the TCI field is for a single state,
the one or more transmission parameters are determined in reference to a second table for the PDSCH different from the first table for the PDSCH in a case the configuration associated with the TCI field is for multiple states, and
indices in the second table are represented by the same number of bits used to represent indices in the first table.

* * * * *